(12) United States Patent
Yamamoto et al.

(10) Patent No.: US 6,424,353 B2
(45) Date of Patent: *Jul. 23, 2002

(54) COMPUTER GAME APPARATUS

(75) Inventors: Shinichiro Yamamoto; Kenji Yamamoto; Hisashi Endo, all of Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,291

(22) Filed: Sep. 9, 1998

(30) Foreign Application Priority Data

| Sep. 11, 1997 | (JP) | 9-267931 |
| Dec. 18, 1997 | (JP) | 9-349056 |
| May 18, 1998 | (JP) | 10-135659 |

(51) Int. Cl.$^7$ ................................................. G09G 5/00
(52) U.S. Cl. ......................... 345/619; 463/7; 463/30; 463/31
(58) Field of Search ................. 463/30–34; 345/331, 345/332, 503–505, 619

(56) References Cited

U.S. PATENT DOCUMENTS

| 5,704,837 A | * | 1/1998 | Iwasaki et al. | 463/38 |
| 5,769,718 A | * | 6/1998 | Rieder | 463/31 |
| 5,779,548 A | * | 7/1998 | Asai et al. | 463/31 |
| 5,830,066 A | * | 11/1998 | Goden et al. | 463/33 |
| 5,947,823 A | * | 9/1999 | Nimura | 463/32 |
| 6,093,105 A | * | 7/2000 | Morihira | 463/38 |
| 6,126,547 A | * | 10/2000 | Ishimoto | 463/42 |
| 6,139,434 A | * | 10/2000 | Miyamoto et al. | 463/32 |
| 6,149,520 A | * | 11/2000 | Takatsuka | 463/4 |
| 6,166,718 A | * | 12/2000 | Takeda | 345/856 |
| 6,175,366 B1 | * | 1/2001 | Watanabr et al. | 345/422 |
| 6,231,440 B1 | * | 5/2001 | Yamashita | 463/7 |

* cited by examiner

Primary Examiner—Jeffery Brier
Assistant Examiner—Anthony J. Blackman
(74) Attorney, Agent, or Firm—Dickstein Shapiro Morin & Oshinsky LLP

(57) ABSTRACT

It is provided a computer game apparatus for displaying an image of virtual space in which first and second characters locate, the image being viewed from a first point in the virtual space to a direction from the first point to a second point in the virtual space, comprising: a first processor for obtaining positions of the first and second characters in the virtual space; and a second processor for setting the first or second point in accordance with a distance between the positions of the first and second characters which are aligned in the direction in the virtual space. According to the present invention, when the characters approach each other in virtual space in a game, the first point in virtual space is raised, so that the image is displayed as virtual space is looked down. Therefore, since the first character manipulated by the player and the enemy character do not overlap in the image, the player can clearly observe the movements of the enemy character. And even when the two characters are fighting in close, since the character controlled by the player can quickly cope with an attack by the enemy character, the game will be more exiting.

28 Claims, 27 Drawing Sheets

COMPUTER GAME APPARATUS

BACKGROUND OF THE INVENTION

1. Field of the Invention

The present invention relates to a computer game apparatus for displaying an image of virtual space in a display screen, and in the virtual space a plurality of characters locate.

2. Related Arts

A computer game apparatus has become popular which is used when playing a game in virtual space in which a player's character controlled by levers operated by a player, combats an enemy character controlled by the game.

In such a game, when two characters in virtual space are located at a distance, they carry weapons, such as firearms, and try to disable or destroy each other by discharging their weapons. But when they are close each other, they engage in hand-to-hand, unarmed combat.

During a game, the back of the player's character is displayed at the front side in the image, and the enemy character is displayed at the far side in the image. To display such an image on the screen, a point of view is set at the upper rear of the player's character in a coordinate system of the virtual space and an image obtained when the virtual space is viewed from the point of view viewing toward the front direction of the player's character is displayed on the screen in accordance with a predetermined coordinate transformation process.

However, when the player's character is displayed at the front side in the image with turning the back, and the enemy character is displayed on the far side of the screen with facing the player's character, in a combat with close distance between the two characters in the image, the two characters will overlap in the image. That is, since the player's character is displayed at the front, the enemy character will be hidden by the player's character and it will be difficult for the player to observe that enemy character character's movements.

SUMMARY OF THE INVENTION

It is, therefore, one objective of the present invention to provide a computer game apparatus which can so display images that during the course of a game in virtual space a player can clearly observe the movements of an enemy character character, even when the two characters are very close.

To achieve the above objective, according to a first invention, it is provided a computer game apparatus for displaying an image of virtual space in which first and second characters locate, the image being viewed from a first point in the virtual space to a direction from the first point to a second point in the virtual space, comprising:

- a first processor for obtaining positions of the first and second characters in the virtual space; and
- a second processor for setting the first or second point in accordance with a distance between the positions of the first and second characters which are aligned in the direction in the virtual space.

According to a second invention, it is provided a computer game apparatus according to the first invention, wherein when the distance between the positions of the first and second characters is less than a predetermined distance, the second processor calculates an angle of the direction with horizon in accordance with the distance, and sets the first or second point based on the angle.

According to a third invention, it is provided a computer game apparatus according to the second invention, wherein the second processor sets the first point higher in a height direction as the distance is shorter, and sets the first point lower in the height direction as the distance is longer.

According to a fourth invention, it is provided a computer game apparatus according to the third invention, wherein, when the angle is greater than a predetermined maximum angle, the second processor sets the first point in accordance with the predetermined maximum angle.

According to a fifth invention, it is provided a computer game apparatus according to the fourth invention, the predetermined maximum angle is approximately 40 degrees.

According to a sixth invention, it is provided a computer game apparatus according to the second invention, wherein when the first character approaches the second character at a higher speed than a normal speed, and the distance between the first and second characters is less than a predetermined distance, the second processor sets the first point in accordance with an angle smaller than the angle obtained by the calculation.

According to a seventh invention, it is provided a computer game apparatus according to the sixth invention, wherein when the speed of the first character is returned to the normal speed or the first character is halted, the second processor sets the first point in accordance with the angle obtained by the calculation.

According to an eighth invention, it is provided a computer game apparatus according to the first invention, wherein when the distance between the first and second characters is less than a predetermined distance, the second processor sets the first point as a distance between the first and second points is shortened.

According to a ninth invention, it is provided a computer game apparatus according to the eighth invention, wherein the second processor sets the first point as the distance between the first and second points is shortened in a first time period.

According to a tenth invention, it is provided a computer game apparatus according to the ninth invention, wherein when the first character approaches the second character at a higher speed than the normal speed, the second processor sets the first point as the distance between the first and second points is shortened in a second time period which is shorter than the first time period.

According to an eleventh invention, it is provided a computer game apparatus according to the first invention, wherein the second processor sets the second point at a first height in the height direction in virtual space, the first height being the vicinity of an upper portion of the other character, and when the distance between the first and second characters is less than a predetermined distance, the second processor sets the second point at a second height higher than the first height.

According to a twelfth invention, it is provided a computer game apparatus according to the eleventh invention, wherein the second processor moves the second point from the first height to the second height in a third time period.

According to a thirteenth invention, it is provided a computer game apparatus according to the twelfth invention, wherein when the first character approaches the second character at a higher speed than the normal speed, the second processor moves the second point from the first height to the second height in a fourth time period which is shorter than the third time period.

According to a fourteenth invention, it is provided a computer game apparatus according to the eleventh invention, wherein the second processor sets the first point higher than the second point.

According to another invention of the present invention, it is provided a computer game apparatus for displaying an image of virtual space in which first and second characters locate, the image being viewed from a first point in the virtual space to a direction from the first point to a second point in the virtual space, comprising:

- a first processor for obtaining movement of the first character in the virtual space; and
- a second processor for setting the first and second points as the first character and a second character are aligned in the direction when the first character is moving at a predetermined speed.

For example, the second processor sets the first point along a line obtained by extending a line segment which runs between one of points constituting the first character and their vicinity and one of points constituting the second character and their vicinity toward the first character, and sets the second point along the line segment or along a line obtained by extending the line segment toward the second character.

When the first and second point are so set, both the first and the second characters are displayed on a display screen even when the first character is moved. Therefore, the second character, which is fighting with the first character manipulated by the player, is prevented from disappearing from the display screen due to the movement of the first character. This setup of the first and second point is effective especially for a virtual space display wherein the first character can move in an arbitrary three-dimensional direction and the second character tends to disappear from the display screen.

According to further another invention of the present invention, it is provided a computer game apparatus for displaying an image of virtual space in which a first character and a plurality of other characters face, the image being viewed from a first point in the virtual space to a direction from the first point to a second point in the virtual space, comprising:

- first processor for obtaining positions of the first character and the other characters in the virtual space; and
- second processor for setting the first and second points in accordance with relationship between the position of the first character and the position of the other characters.

In a game wherein the first character fights the other characters, the first and second point are set in accordance with relationship between the position of the first character and the position of the other characters, and the viewing direction is switched to provide a display on which the relationship between the positions can easily be understood.

The relationship between the positions is, for example, a distance between the first character and a second character, of the plurality of characters, which is closest to the first character.

When the distance between the first character and the second character in the virtual space is greater than a predetermined distance, the second processor sets the first point and the second point so that the first character and the second character are displayed aligned in the depth direction of the image, and when the distance in the virtual space is equal to or less than the predetermined distance, the second processor sets another first point and another second point so that the first and the second characters are displayed in the transverse direction on the image.

It is preferable that the first point and the second point are located higher by a predetermined height than the another first point and the another second point. In addition, when the plurality of other characters are located within the predetermined distance, it is preferable that the second processor sets the another first point so as to increase an angle of another direction from the another first point to the another second point with horizon.

DETAILED DESCRIPTION OF THE PREFERRED EMBODIMENTS

Figure 1:
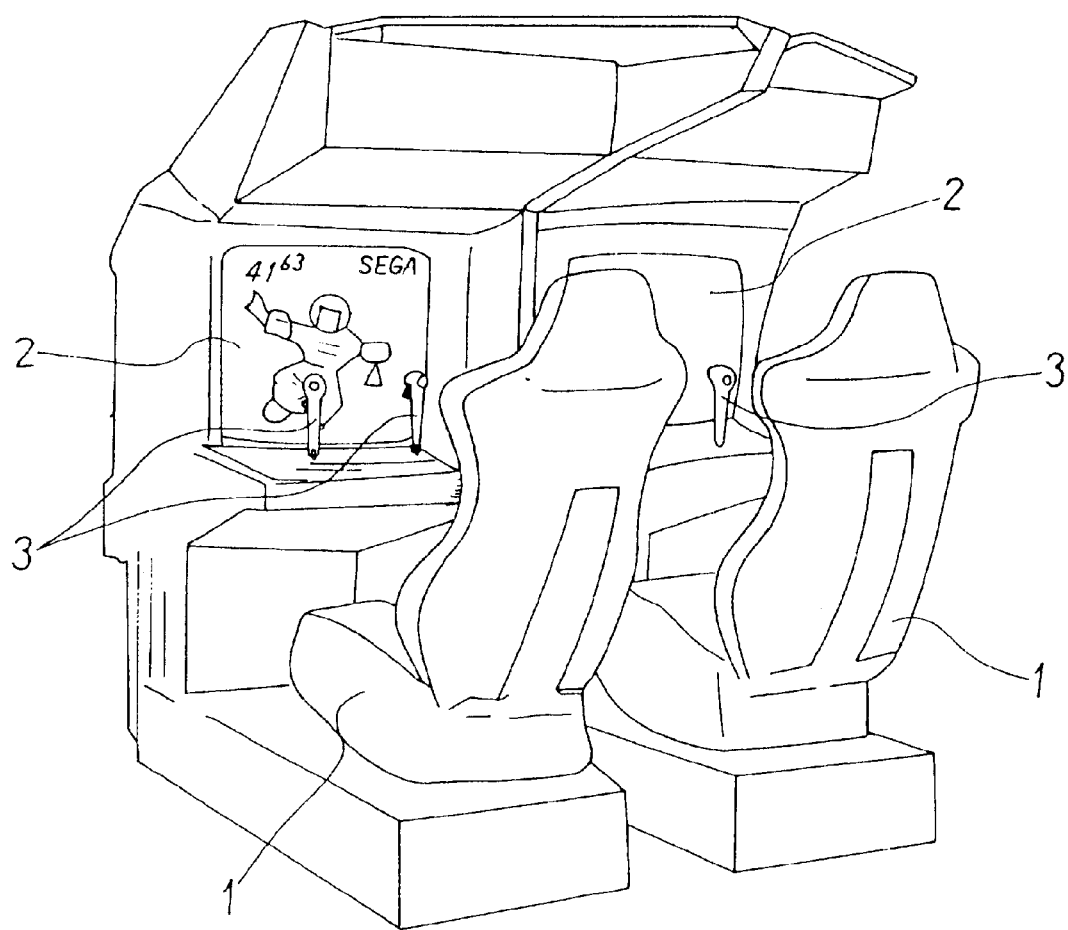
FIG. 1 is a diagram showing the external appearance of a computer game apparatus according to the present invention.

The preferred embodiments of the present invention will now be described. It should be noted, however, that the technical scope of the present invention is not limited to these embodiments. Also note that the same reference numerals are used throughout to denote corresponding or identical components in the drawings.

Figure 2A:
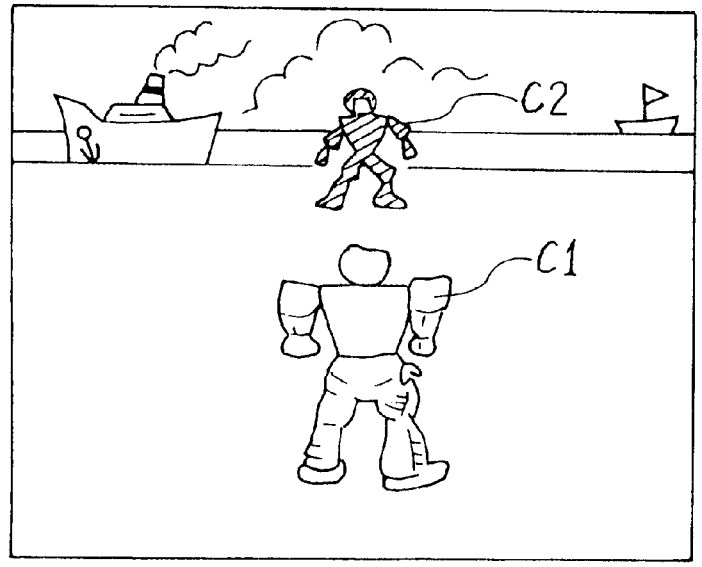
FIGS. 2A and 2B are diagrams showing example images displayed on a screen of the display for a three-dimensional virtual space wherein characters C1 and C2 combat each other.
Figure 2B:
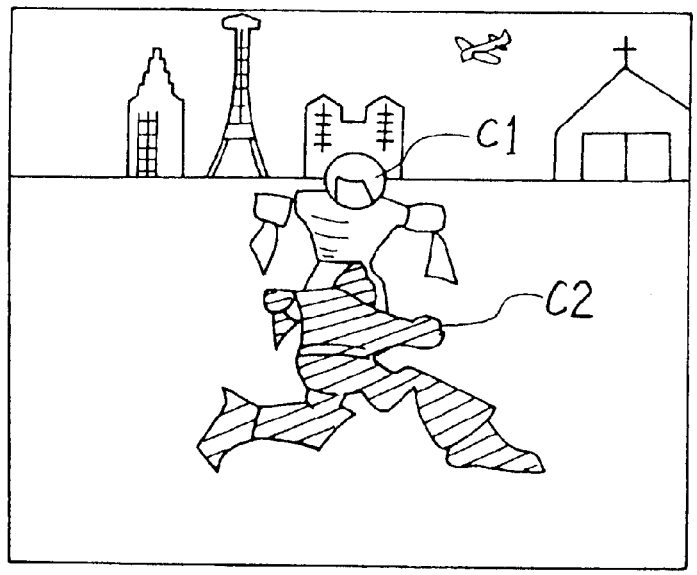

FIG. 1 is a diagram showing the external appearance of a computer game apparatus (game unit) according to the present invention. In FIG. 1, two game units are coupled together. When a player occupies a seat 1 and deposits a predetermined sum in a coin slot (not shown), a game begins. A pseudo-three-dimensional virtual space wherein characters C1 and C2 combat each other is displayed onto a screen of a display 2, as is shown in FIGS. 2A and 2B. While watching the game screen on the display 2, the player 1 manipulates operation levers 3, each of which is fitted with a button, to control the character (hereinafter referred to as a "player's character") C1 and combat the other character (hereinafter referred to as an enemy character) C2.

Figure 3:
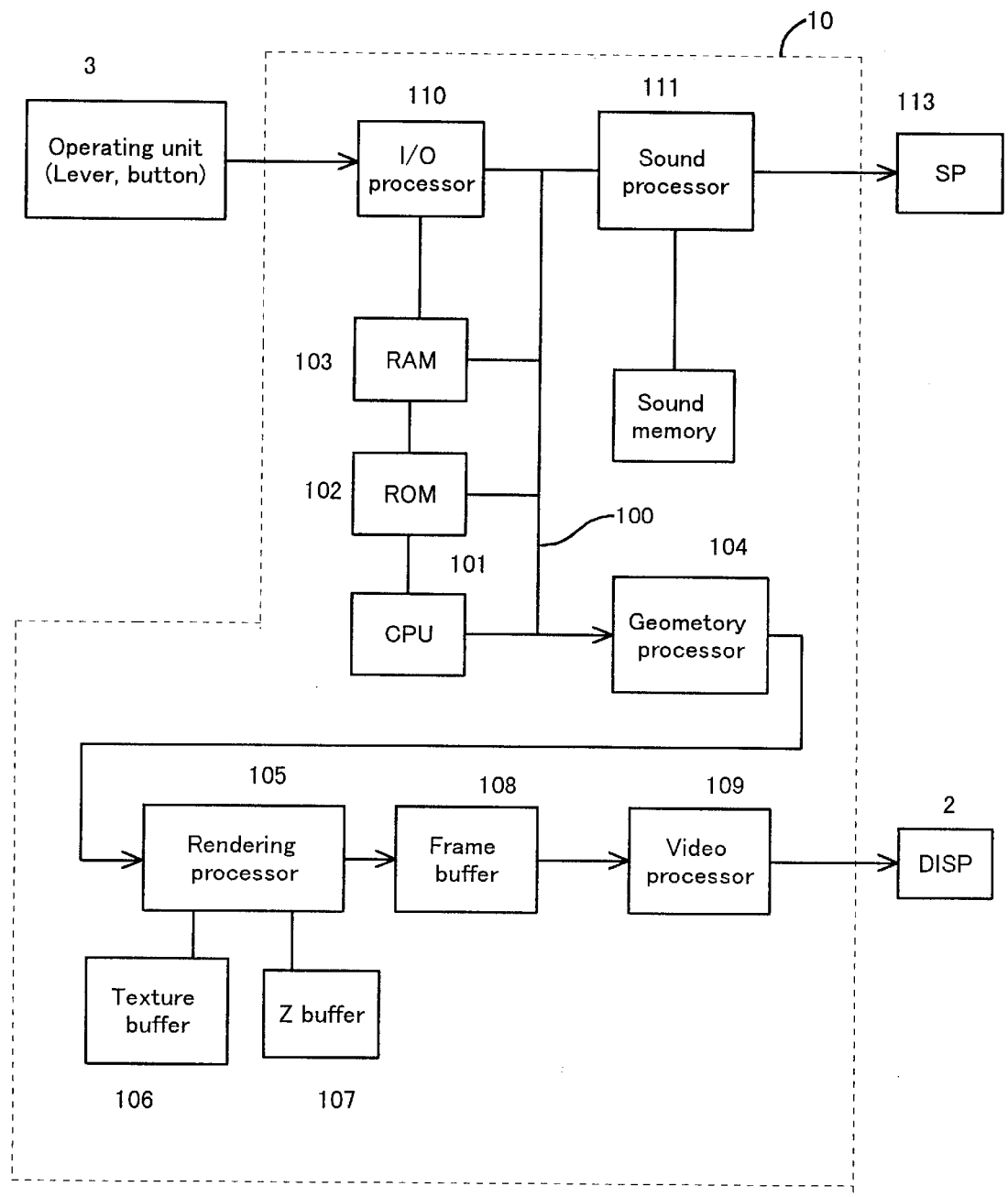
FIG. 3 is a block diagram illustrating an example arrangement of a game unit according to the present invention which is built-in the computer game apparatus.

FIG. 3 is a block diagram illustrating an example game unit arrangement according to the present invention which is incorporated in the game apparatus. In FIG. 3, a block enclosed by a broken line is the section which is to be stored in the main body of the game unit. The following components, including a CPU, are interconnected by a bus 100.

A CPU 101 executes a game based on a game program stored in a ROM 102. In a RAM 103 are stored predetermined game parameters, such as coordinates in virtual space for characters which are updated as the game progresses.

These parameters are temporarily stored in the RAM 103 and are transmitted to a geometric processor 104 which functions as coordinate setting means. The geometric processor 104 performs specific coordinate transformations, which will later be described in detail, based on vertex data for polygons constituting characters and the background for a game in three-dimensional virtual space. Briefly speaking, a predetermined coordinate system of a polygon set in three-dimensional virtual space are transformed into a coordinate system based on a point of view which is a point set in the virtual space for viewing the virtual space from itself toward a viewing direction.

A rendering processor 105 is connected to the geometric processor 104, and a texture buffer 106 is connected to the rendering processor 105. The vertex data for the polygons and texture data to be mapped onto the polygons are read from the ROM 102, and are temporarily stored in the texture buffer 106. The rendering processor 105 employs the texture data for the polygons, which are stored in the texture buffer 106, to provide coloring, shading and texture for the polygons.

Furthermore, the rendering processor 105 transforms the coordinate system based on the point of view for the polygon in three-dimensional virtual space into two-dimensional coordinate system in order to display the polygon on the display 2. In a Z buffer 107 connected to the rendering processor 105 are stored data, concerning the direction of the depth (Z direction), which are used to transform the three-dimensional coordinates of the polygon and obtain the two-dimensional coordinates (e.g., such data as which polygon should be displayed at the front).

A frame buffer 108 is connected to the output terminal of the rendering processor 105. Image data for one image on the screen are stored in the frame buffer 108. The image data for one image of the screen are read from the frame buffer 108 and are converted into video signals by a video processor 109, and the resultant data are sequentially displayed on the display 2.

An operating unit 3, which includes levers or switches manipulated by a player, is connected to an I/O processor 10. Based on an operating signal entered at the operating unit 3, the CPU 101 processes the coordinates of a character in virtual space, and transmits the result to the geometric processor 104.

A sound processor 111 is also connected to the bus 100 to control tone generation for a PCM/FM sound source. A sound memory 112 for storing audio data is connected to the sound generator 111.

The digital audio data controlled by the sound processor 111 are converted into analog data by a D/A converter (not shown), and the resultant analog audio signals are transmitted to a speaker 113.

A method for processing the coordinates for a character will now be described. First, the locations of characters in virtual space are represented by position coordinates ($X_W$, $Y_W$, $Z_W$) in the three-dimensional coordinate system (the predetermined coordinate system). In virtual space, the position of the background, such as a fixed object rather than characters, is also represented by the predetermined coordinate system, and the shifting of characters is regarded as the predetermined coordinate system change. Specifically, the position coordinates for characters are acquired through processing performed by the CPU 101 based on information concerning distance and direction of shift, which is included in an operating signal issued by the operating unit 3.

On the display 2 a two-dimensional image is displayed, as viewed in a predetermined direction from a specific point (point of view) in the predetermined coordinate system of three-dimensional virtual space. This gives a player the impression that an image has been displayed onto the screen of a display 2 by a video camera located at a predetermined position in virtual space.

Figure 4:
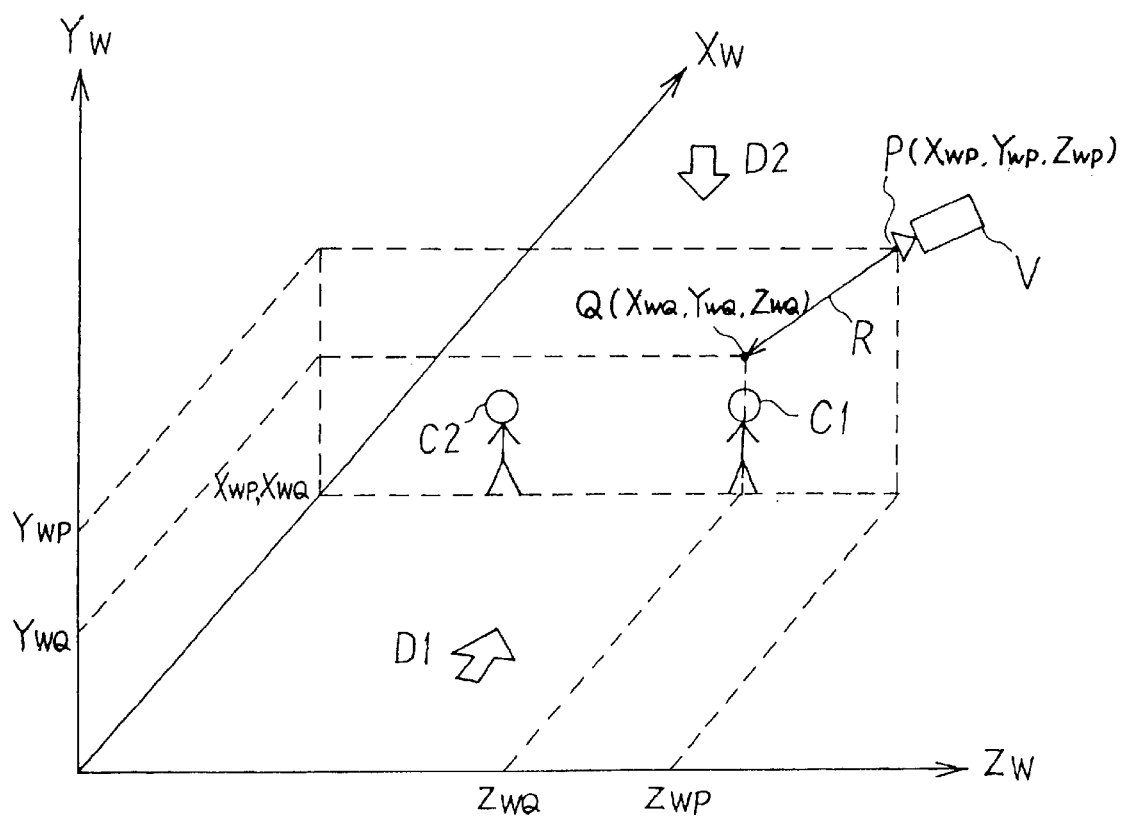
FIG. 4 is a diagram showing an example three-dimensional virtual space wherein characters C1 and C2 are located.

When, for example, characters C1 and C2 are located in three-dimensional virtual space as is shown in FIG. 4, their position coordinates are determined by using the predetermined coordinates system ($X_W$, $Y_W$, $Z_W$) As is shown in FIG. 4, the point of view ($X_{WP}$, $Y_{WP}$, $Z_{WP}$) is positioned at the upper rear of the player's character C1 in the predetermined coordinate system, and the viewing direction R originating at a point of view P is set so that it points, for example, toward a point of fixation $Q(X_{WQ}, Y_{WQ}, Z_{WQ})$, which is a point viewed from the point of view, near the upper portion of the player's character C1 (e.g., a slightly higher portion than the head of the player's character C1). In the following drawings, including FIG. 4, the symbol for the virtual video camera V is shown at the point of view P to make the explanation easier.

The coordinates of the individual characters in the predetermined coordinates system, based on the point of view P and the viewing direction R, are transformed by the geometric processor 104 in FIG. 3, which is the coordinate second processor, into the coordinate system based on the point of view ($X_V$, $Y_V$, $Z_V$). Furthermore, to display the characters on the screen, the rendering processor 105 in FIG. 3 transforms these coordinates into two-dimensional screen coordinate system by a predetermined projection conversion.

A further explanation will be given for the point of view P and the viewing direction R in the predetermined coordinate system and a corresponding two-dimensional image on the display 2 in accordance with the coordinate system based on point of view.

Figure 5A:
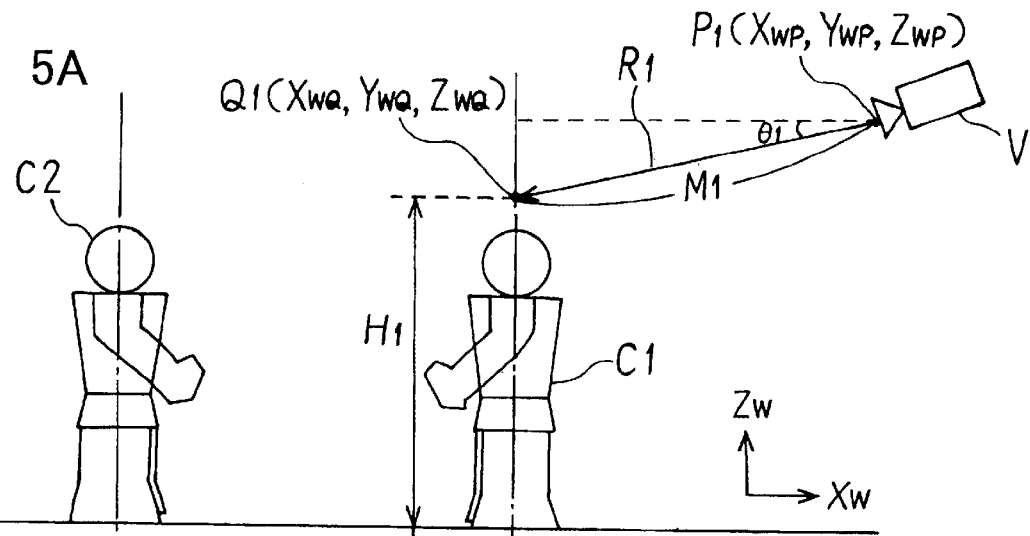
FIGS. 5A and 5B are diagrams showing normal point of view P and viewing direction R in virtual space.
Figure 5B:
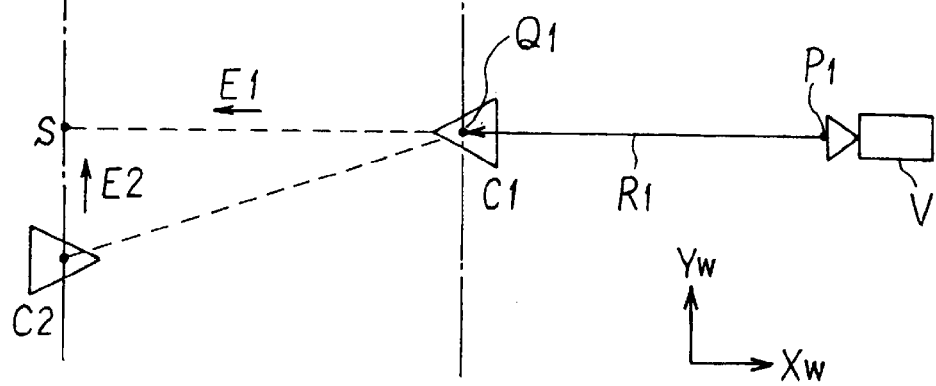

FIGS. 5A and 5B are diagrams showing the normal point of view P and viewing direction R in virtual space and respectively showing virtual space viewed in directions D1 and D2 in FIG. 4. A distance L between the player's character C1 and an enemy character C2 in the predetermined coordinate system is longer than a predetermined distance L1, which is a limit of a close range in which the two characters fight each other. As is shown in FIGS. 5A and 5B, the point of view P is located rear above the player's character C1. Specifically, the point of view P is located at a distance M1 from point of fixation Q1, which is located at a predetermined distance H1 from the lower end position of the player's character C1 in the height direction $Y_W$. The viewing direction R from the point of view P1 to the point of fixation Q1 is downward relative to the horizontal direction at an angle θ1. The angle θ1 is, for example, 10 degrees.

Figure 6:
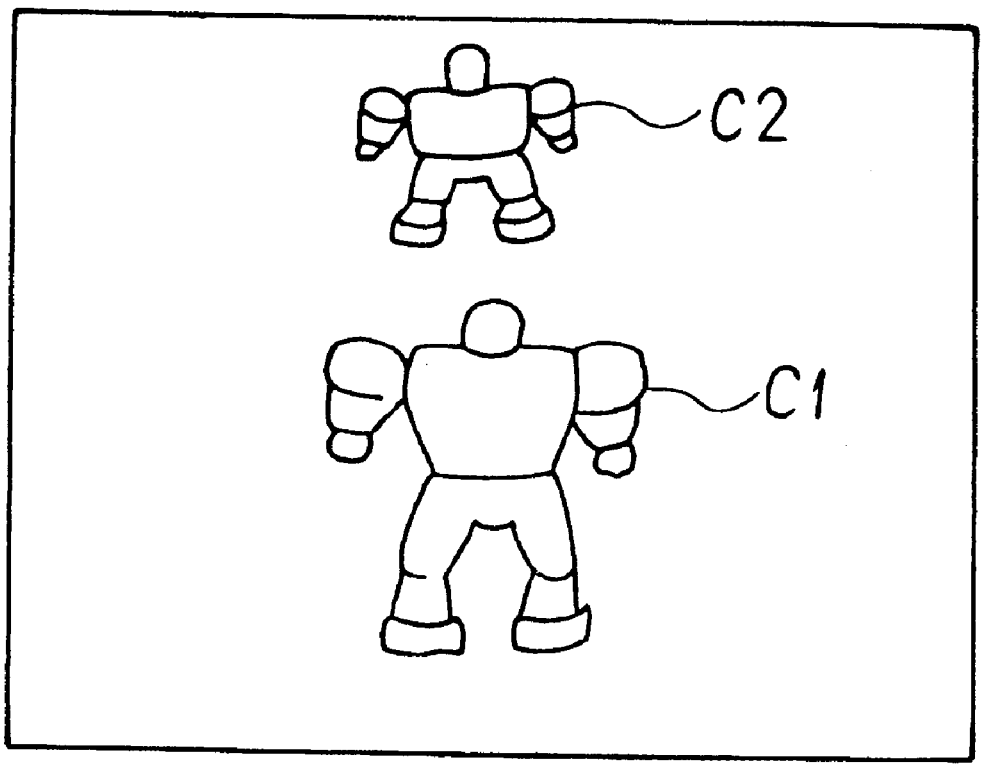
FIG. 6 is a diagram showing an example screen of the display in accordance with FIGS. 5A and 5B.

In FIG. 6 is shown a screen on the display 2 corresponding to FIGS. 5A and 5B. As is shown in FIG. 6, when the player's character C1 and the enemy character C2 stand at predetermined distance L1 or farther, the enemy character C2 appears on the display 2 without overlapping the player's character C1.

Figure 7A:
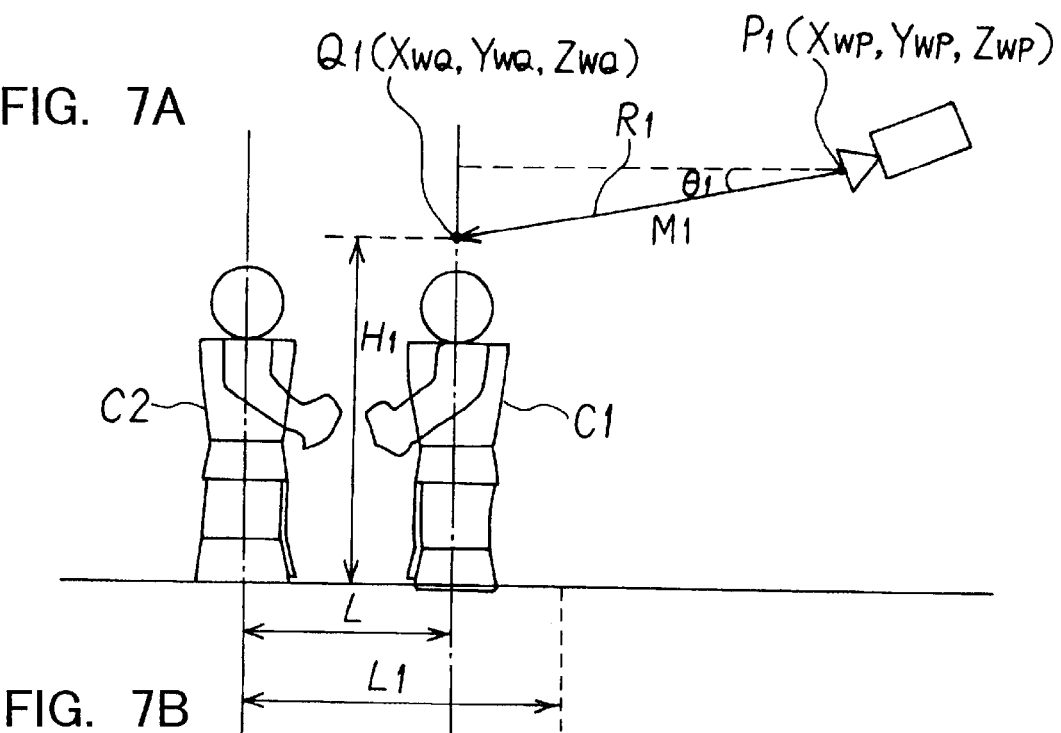
FIGS. 7A and 7B are diagrams corresponding to FIGS. 5A and 5B when player's character C1 and an enemy character C2 are close each other.
Figure 7B:
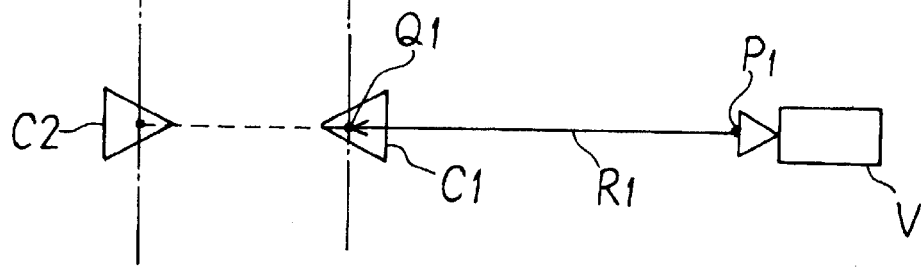
Figure 8:
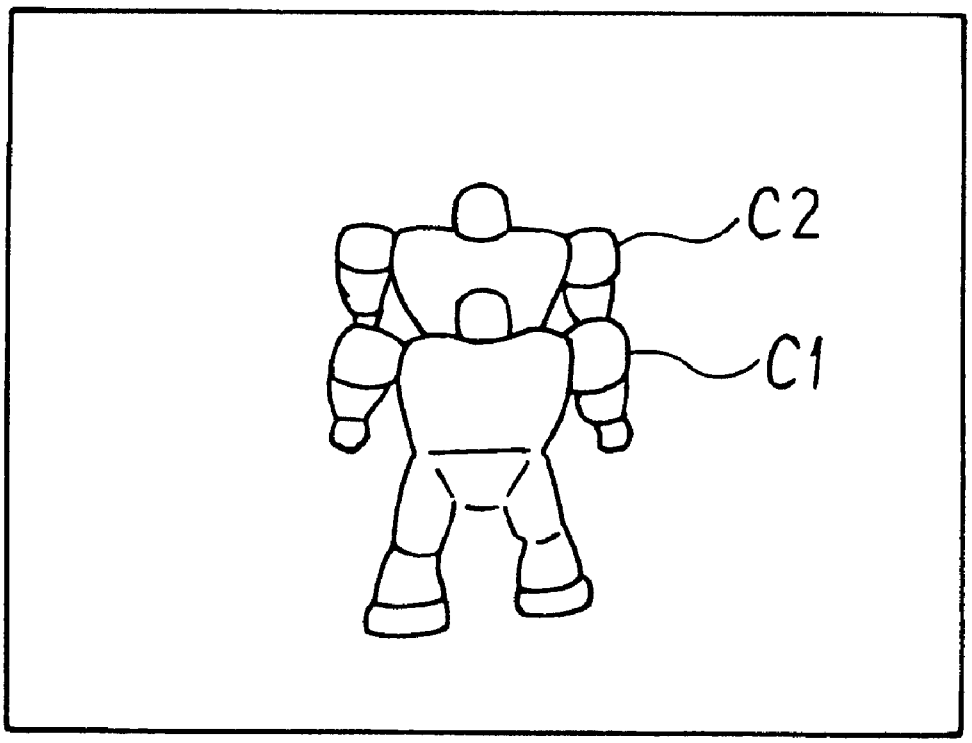
FIG. 8 is a diagram showing an example screen on the display in accordance with FIGS. 7A and 7B.

FIGS. 7A and 7B are diagrams, corresponding to FIGS. 5A and 5B, showing the player's character C1 and the enemy character C2 when they are near each other. In FIG. 7A, the distance L between the characters C1 and C2 is less than the predetermined distance L1. Therefore, on the screen of the display 2, the enemy character C2 overlaps the player's character C1 at the front as is shown in FIG. 8. Thus, the player can not observe the movement of the portion of the enemy character C2 which is hidden by the player's character C1.

[First Embodiment]

According to a first embodiment of the present invention, therefore, the distance L between the player's character C1 and the enemy character C2 in virtual space is shorter than a predetermined distance L1, and to be described later in detail, the overlapping of the enemy character C2 and the character C1 on the screen is prevented by changing the point of view P.

Figure 9A:
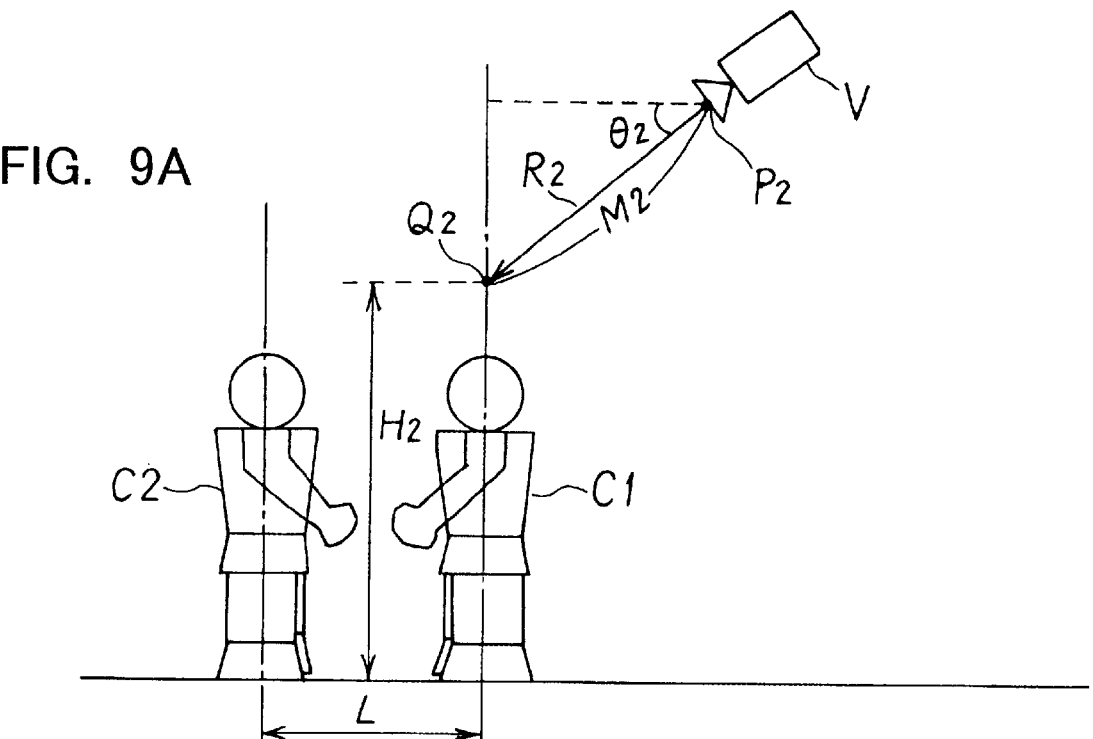
FIGS. 9A and 9B are diagrams showing point of view P and viewing direction R according to a first embodiment of the present invention when player's character C1 and an enemy character C2 are close each other.
Figure 9B:
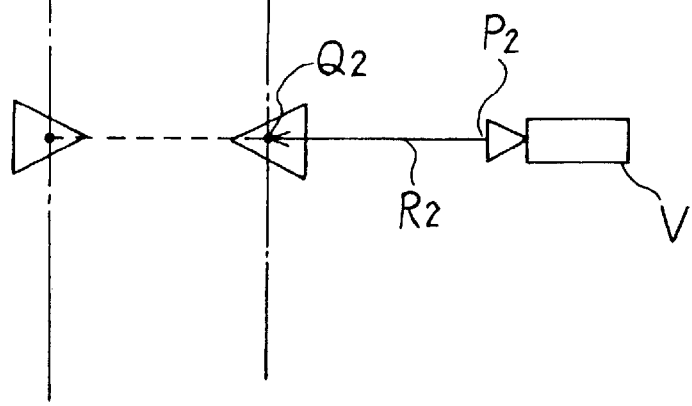

FIGS. 9A and 9B are diagrams, corresponding to FIGS. 7A and 7B, showing point of view P and viewing direction R according to the first embodiment of the present invention when the distance L between the two characters C1 and C2 is short. In FIGS. 9A and 9B point of view P2 is located at a distance M2, which is shorter than the distance M1, from point of fixation Q2, which from the lower end of the player's character C1 is positioned at a distance H2 which is greater than the predetermined distance H1. Relative to the horizontal direction, the viewing direction R from the point of view P2 to point of fixation Q2 is downward at an angle θ2 (e.g., 40 degrees), which is greater than θ1.

Figure 10:
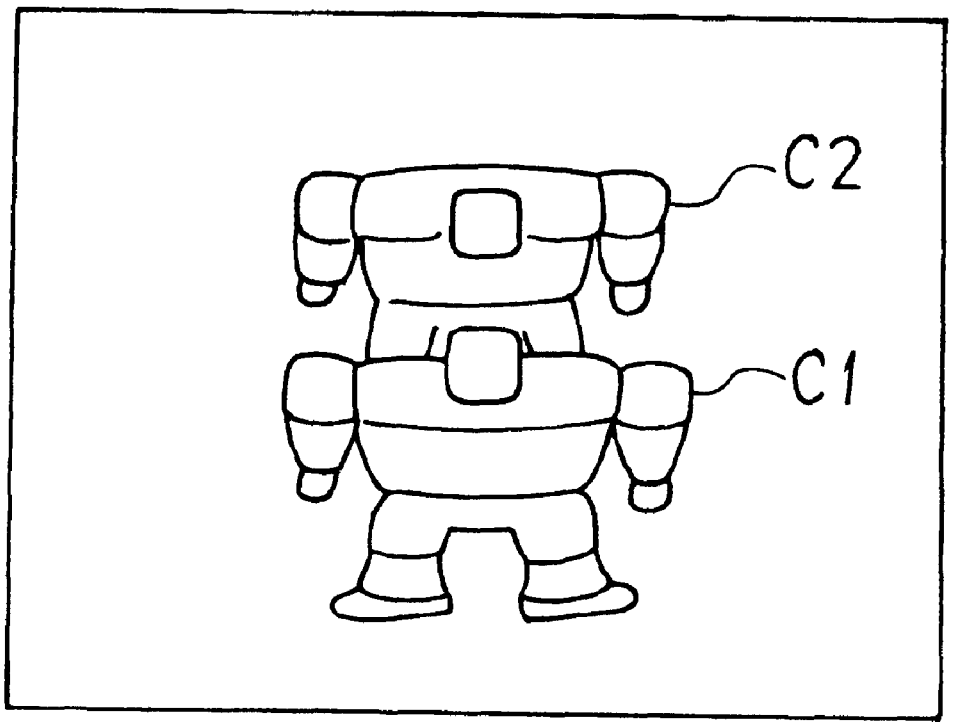
FIG. 10 is a diagram showing an example screen of the display in accordance with FIGS. 9A and 9B.

In FIG. 10 is shown the screen of the display 2 in accordance with FIGS. 9A and 9B. As is described above, since the angle in the viewing direction R2 is greater than that in the viewing direction R1, the point of view P2 is located higher than the point of view P in the direction of the height (direction $Y_W$ in FIG. 4). Therefore, a view when looking down from the point of view P2 is shown on the display 2.

Since the view looking down on the virtual space is as shown on the display 2, the characters C1 and C2 do not overlap each other on the screen.

Therefore, the player can clearly observe the movement of the enemy character, and even when the two characters approach each other and fight, the player can quickly cope with an attack by the enemy character.

The angle θ2 is changed in accordance with the distance L between the characters C1 and C2 when the distance L becomes less than the predetermined distance L1. That is, as the player's character C1 approaches the enemy character C2 and the distance L is reduced to the predetermined distance L1 and is then further shortened, the angle θ2 is increased and the point of view P2 is raised. An equation for calculating the angle θ2 is represented by:

$$\theta2 = \arctan(A1/L) \quad (1)$$

wherein A1 is a predetermined constant. When the player's character C1 is positioned with a low attitude as is shown in FIG. 2B, a constant A2 smaller than the constant A1 is employed.

In addition, when the angle θ2 obtained by equation (1) is greater than predetermined maximum angle θmax (e.g., 40 degrees), the angle θ2 is set, for example, to the maximum angle θmax. This is done for the following reasons. When the angle θ2 is greater than the maxim angle θmax, the point of view P is located immediately above the player's character C1. In this case, it is difficult for the player to apprehend the extent of the three-dimensional distance represented in the virtual space view, or to distinguish between an upward and a downward attack by the enemy character C2. Therefore, to prevent the player from feeling clumsy, the maximum angle θmax, the upper limit for the angle θ2, is set.

The distance between the two characters C1 and C2 is employed as the distance L in equation (1) when the player's character C1 faces the enemy character C2 as is shown in FIG. 7B. When, as is shown in FIG. 5B, the player's character C1 does not face the enemy character C2, the distance L between the two is the distance from the coordinate (not shown) of the center of the player's character C1 to an intersection S whereat a line extending in direction E1, in which the player's character C1 faces, intersects a line originating at the enemy character C2 and extending in direction E2 perpendicular to direction E1.

When the distance L between the characters C1 and C2 becomes less than the predetermined distance L1 as the player's character C1 approaches the enemy character C2 at a higher speed than normal, during this rapid movement, the viewing angle θ, which is the angle formed by the viewing direction and the horizontal direction, is so set that it is smaller than the angle θ2 which is acquired from equation (1) (e.g., is set to half of the angle θ2). When the player's character C1 is halted, the viewing angle θ is set to the angle θ2 obtained by equation (1). In other words, while the player's character C1 is moving fast, changes in the viewing angle θ are limited. This is because if the viewing angle θ is increased in accordance with equation (1) and the position of the point of view P is raised, the moving speed of the player's character C1, which the player can feel, is reduced.

Therefore, during the rapid movement of the player's character C1, a predetermined limit is provided for the angle θ2 obtained using equation (1). When the player's character C1 is halted, the point of view P2 is set to coordinate which correspond to the angle θ2 obtained using equation (1).

In FIG. 9A, the distance M2 between the point of view P2 and the point of fixation Q2 is shorter than the normal distance M1. If the viewing angle θ is increased and the position of the point of view P is raised, the sizes of the characters are reduced on the screen, and it is almost impossible to clearly observe their movements. Therefore, when the two characters approach each other and the viewing angle θ is increased, the distance between the point of view P2 and the point of fixation Q2 is shortened in order to prevent the sizes of the characters C1 and C2 displayed on the screen from being reduced.

When the distance M1 is changed to the distance M2 at the time the distance L between the two characters becomes less than the distance L1, the view on the display 2 changes so quickly it makes a player who is watching the screen feel clumsy. Therefore, a predetermined period of time T1 is used to make the change from the distance M1 to the distance M2. Thus, the view displayed on the screen resembles the view obtained when a camera is zoomed in on a subject, and the player does not feel clumsy.

In addition, when the player's character C1 rapidly approaches the enemy character C2, and the distance L becomes shorter than the distance L1, a time T2, which is shorter than the time T1 (e.g., is shorter by 20% than T1), is spent for the change from the distance M1 to the distance M2 in order to emphasize the speed.

In addition, when the distance L between the two characters is shorter than the predetermined distance L1, the position of the point of fixation is also raised from the height H1 to the height H2. The reason for this is as follows: when the distance L is shorter than the predetermined distance L1, the viewing angle θ is increased and the point of fixation P is raised so that the two characters do not overlap on the screen. If only the viewing angle θ is increased without changing the height of the point of fixation Q so that the characters do not overlap, the viewing angle θ must be larger than necessary. Since the maximum angle θmax is provided for the above described reason, the increase in the viewing angle θ must be limited.

Therefore, when the viewing angle θ is increased and the position of the point of fixation Q is raised from the height H1 to the height H2, the position of the point of view P is raised without the viewing angle θ being increased more than necessary, so that the characters can be displayed without overlapping.

When the point of view P is set in advance, the point of fixation Q may be obtained based on the angle θ obtained using equation (1).

Figure 11A:
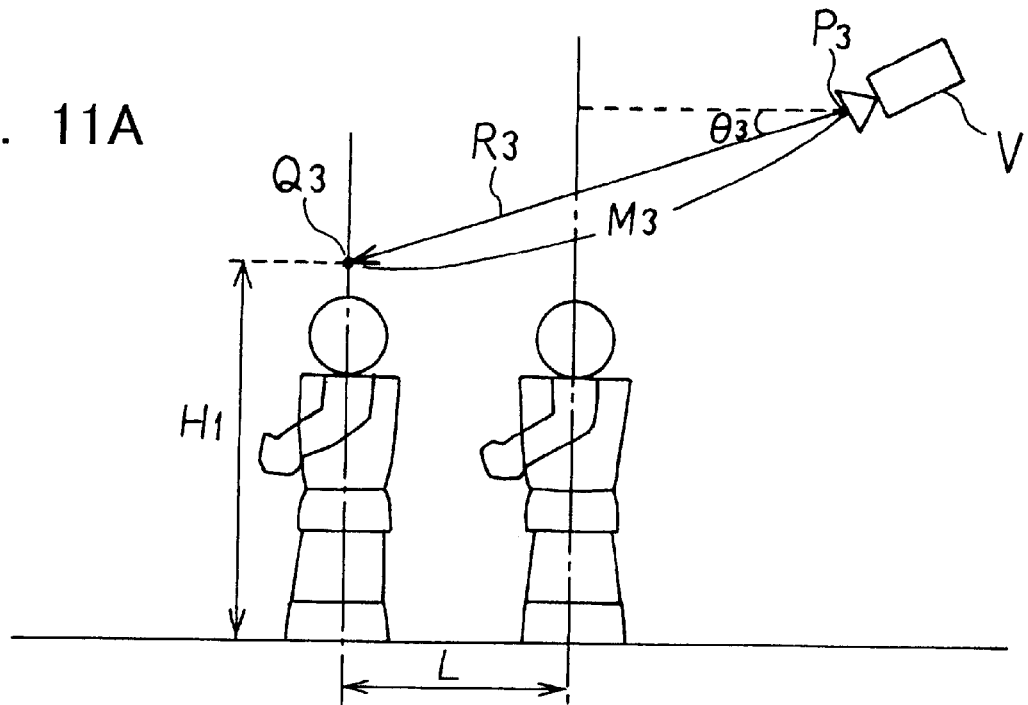
FIGS. 11A and 11B are diagrams showing an example where the enemy character C2 is behind the player's character C1 in virtual space.
Figure 11B:
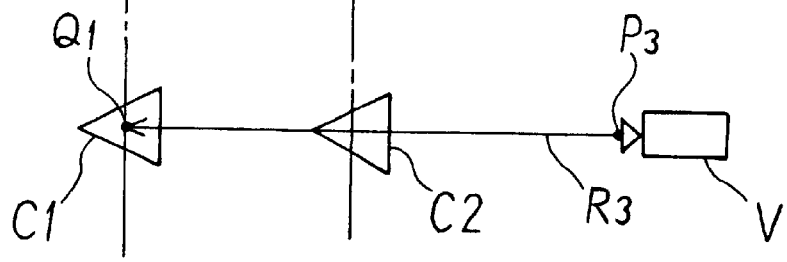
Figure 12:
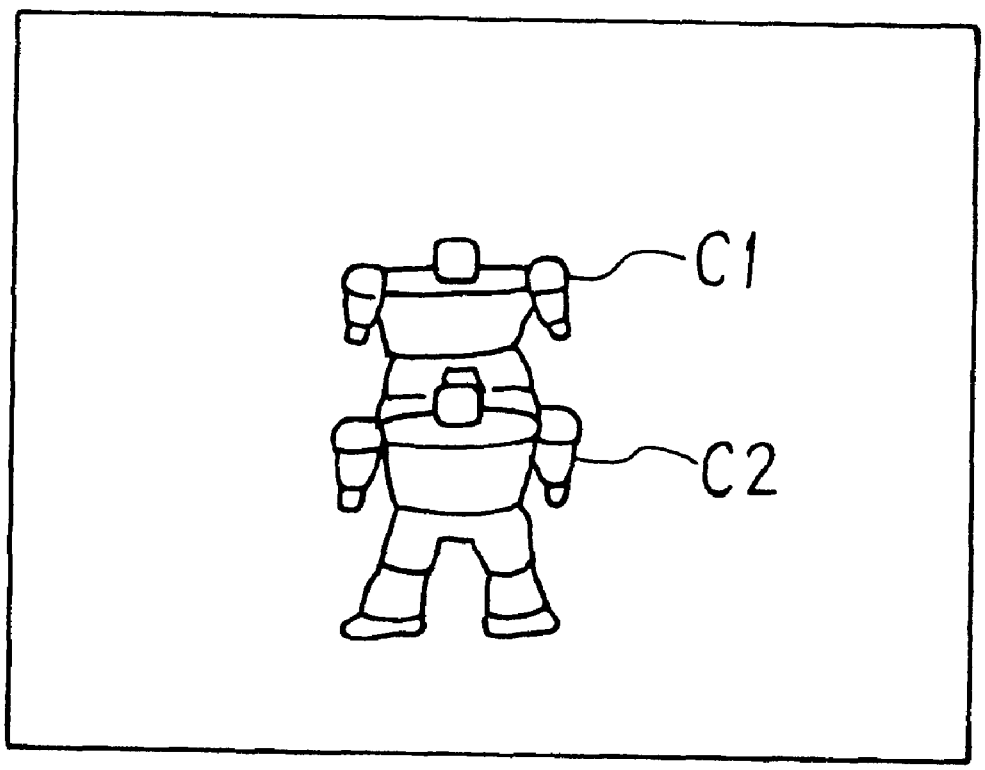
FIG. 12 is a diagram showing an example screen on the display in accordance with FIGS. 11A and 11B.

In some cases, the enemy character C2 moves behind the player's character C1 when the two are near each other. FIGS. 11A and 11B are diagrams of views in virtual space, taken in the directions D1 and D2 in FIG. 4, when the enemy character C2 is behind the player's character C1. FIG. 12 is a diagram showing the screen of the display 2 in this case. In FIG. 12, the enemy character C2 is displayed in front of the player's character C1. The point of view P and the viewing angle θ are determined, for example, as follows.

Since the two characters are at close range, viewed from the normal point of view P1 in FIG. 5 they overlap on the screen of the display 2, as is shown in FIG. 6. However, since the enemy character C2 is displayed in the front in FIG. 12, the enemy character C2 is not hidden by the player's character C1 as in FIG. 6. Further, since the player's character C1 is controlled by the player, the manipulation by the player is not affected even if the player's character C1 is partially hidden by the enemy character C2.

In this case, therefore, the viewing angle θ need not be increased too much, and need not be delicately changed using equation (1) in accordance with the distance L separating the two characters. In addition, as is shown in FIGS. 11A and 11B, point of view P3 is set at a position above the point of fixation Q1 at a viewing angle θ3 (e.g., 22 degrees), which is slightly greater than the normal angle θ1. The viewing angle θ3 in viewing direction R3 is fixed regardless of how the distance L between the characters changes as they approach each other.

Distance M3 between the point of view P3 and the point of fixation Q1 is set so that it is greater than the distance M1 in FIG. 4. This is done because the size of the enemy character C2 when it is displayed at the front of the screen is prevented from being increased.

Figure 13:
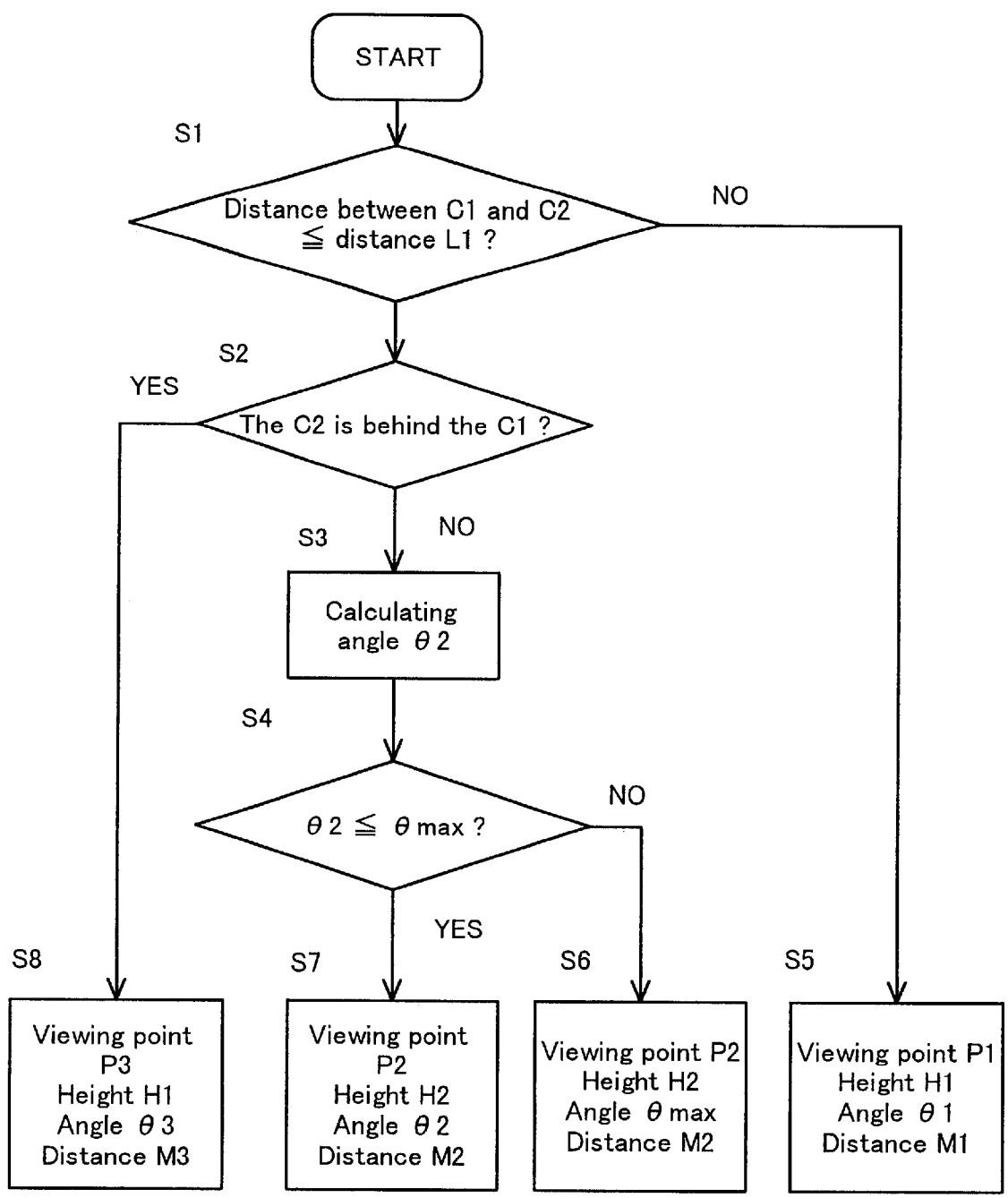
FIG. 13 is a flowchart for setting point of view P which corresponds to the distance between the player's character C1 and the enemy character C2.

FIG. 13 is a flowchart for setting the point of view P which corresponds to the distance between the characters C1 and C2. First, at step S1 a check is performed to determine whether the distance between the player's character C1 and the enemy character C2 is not greater than a predetermined distance L1. When at step S1 the distance L is equal to or greater than the predetermined distance L1, next step is step S5.

That is, step 5S corresponds to the case shown in FIG. 4. The point of view P is P1, which is separated from the point of fixation Q1 by the distance M1 and is positioned at height H1 above the lower end of the player's character C1, and which, at the angle θ1 relative to the horizontal direction, is located above the point of fixation Q and to the rear of the player's character C1.

When at step S1 the distance L is less than the predetermined distance L1, at step S2 a check is performed to determine whether the enemy character C2 is present behind the player's character C1. When it is ascertained at step S2 that the enemy character C2 is behind the player's character C1, next step is step S8.

That is, step S8 corresponds to the case in FIG. 11. The point of view P is P3, which is located at the distance M3 from the point of fixation Q1 positioned at the height H1 above the lower end of the player's character C1, and which, at the angle θ3 relative to the horizontal direction, is located above the point of fixation Q1 and to the rear of the player's character C1.

When at step S2 the enemy character C2 is facing the player's character C1, next step is step S3. Step S3 corresponds to the case in FIG. 9, and the viewing angle θ2 is obtained by using equation (1). When the obtained angle θ2 is smaller than the maximum angle θmax, next step is step S7. The point of view P is P2, which is located at the distance M2 from the point of fixation Q2 which is positioned at the height H2 which is greater than the height Hi, and which, at the angle θ2 relative to the horizontal direction, is located above the point of fixation Q2 and to the rear of the player's character C1.

When the obtained viewing angle θ2 is equal to or greater than the maximum angle θmax, next step is step S6. The point of view P is P2, which is located at the distance M2 from the point of fixation Q2 which is positioned at the height H2 which is greater than the height H1, and which, at the maximum angle θmax relative to the horizontal direction, is located above the point of fixation Q2 and to the rear of the player's character C1.

In the first embodiment of the present invention, the point of view and the point of fixation are obtained by using equation (1), but they may be obtained without any calculations being performed. For example, a table for point of views and point of fixations which are determined in advance in accordance with distances between two characters may be stored in a memory (e.g., the ROM 102 in FIG. 3) of the computer game apparatus.

In this embodiment, the enemy character C2 is not limited to a single character, and there may be a plurality of enemy characters C2. In this case, the point of view and the point of fixation may be changed in accordance with the distance between the player's character C1 and an intermediate position located among a plurality of enemy characters.

Further, the first embodiment is not limited to the above described combat game. For example, for a skiing game in which a player can enjoy virtual skiing by the manipulation of a virtual skier on the display 2, the point of view and the point of fixation may be changed in accordance with the distance between the skier and an obstacle.

[Second Embodiment]

A second embodiment of the present invention will now be described. In the above combat game wherein the player's character C1 combats an enemy character C2 in virtual space, there are a "ground stage" whereat the characters fight in a specific ground location set in virtual space, and a "space stage" whereat the characters combats in a space universe wherein they can move to arbitrary three-dimensional positions. These two stages are selected by the player, or appear as the game progresses. In this embodiment, the position of a video camera V (e.g., the point of view P and the point of fixation Q) is changed in accordance with a selected stage.

Moving modes for the player's character C1 will now be described. A "normal mode" and a "dash mode" are prepared as the moving modes for the player's character C1. The normal mode is selected by the player manipulating the levers of the operating unit 3, without depressing any button thereof. In the normal mode, so long as the lever is inclined, the player's character C1 continues to move at speed v1 in the direction of inclination of the lever.

The dash mode is selected by the player by manipulating a lever while depressing a button. In the dash mode, so long as the lever is inclined, the player's character C1 continues to move at speed v2, which is greater than the speed v1, in the direction of inclination of the lever. Therefore, by switching between the two modes which provide different moving speeds for the player's character C1, the player controls the player's character C1 while it fights the enemy character C2.

Figure 14:
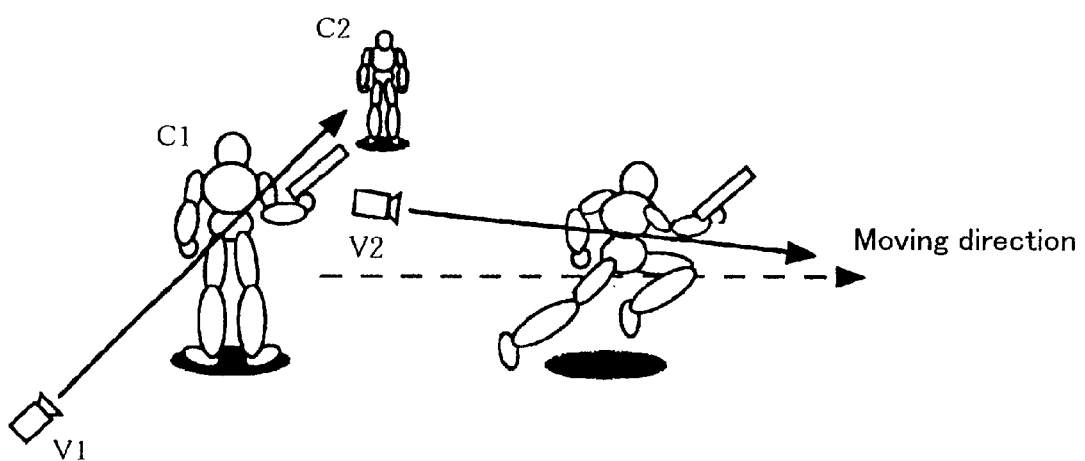
FIG. 14 is a diagram showing the locations of cameras V when a virtual space location constitutes a "ground stage"
Figure 15:
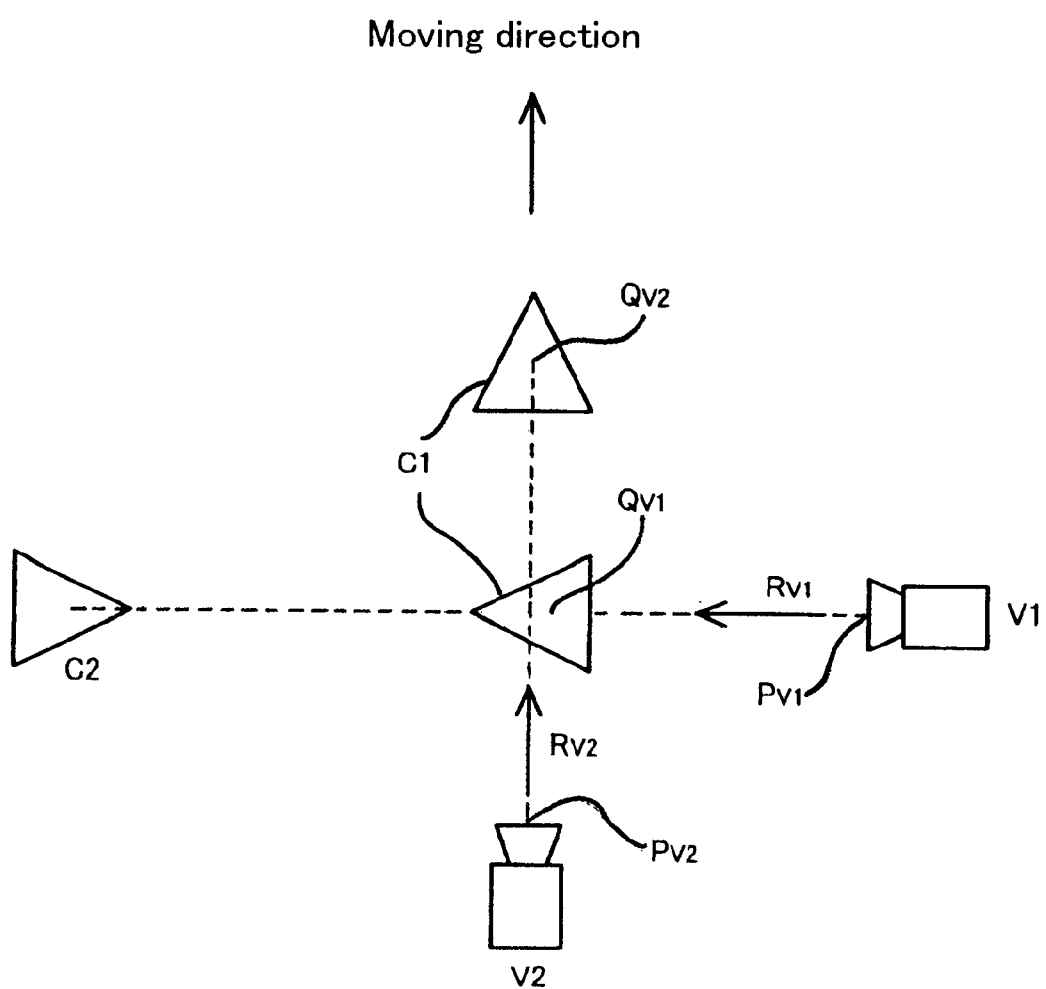
FIG. 15 is a top view of the virtual space location in FIG. 14 for explaining point of view P, point of fixation Q and viewing direction R in the ground stage.

FIG. 14 is a diagram for explaining the position of the camera V when the ground stage is selected in virtual space, and FIG. 15 is a top view of the virtual space location in FIG. 14, showing the point of view P, the point of fixation Q and the viewing direction R. As is shown in FIG. 15, when the two characters C1 and C2 face each other in static positions in the ground stage, a view taken at the camera position V1 is displayed on the screen. That is, point of view $P_{V2}$ is set to the rear of the player's character C1 as in the first embodiment, and viewing direction $R_{V2}$, extending from the point of view $P_{V2}$, is set, for example, facing toward point of fixation $Q_{V1}$ at the position of the player's character C1. In other words, the viewing direction R progresses forward from the player's character C1. Therefore, as in FIG. 6, the player's character C1 is displayed at the front of the display 2, and the enemy character C2 is displayed at the rear in the screen.

When the player's character C1 is to move in the normal mode or in the dash mode, the player's character C1 faces in the moving direction. Therefore, a view taken at the camera position V2 is shown on the display 2. That is, at the time the player's character C1 moves, point of view $P_{V2}$ is set at the rear relative to the direction of movement of the player's character C1, and point of fixation $Q_{V2}$ is set at the position of the player's character C1, as is shown in FIG. 15. Thus, the viewing direction $R_{V2}$ corresponds to the forward direction of the player's character C1, i.e., the direction of movement (in FIG. 14, in the dash mode the player's character C1 moves to the right with respect to the enemy character C2). Therefore, when the player's character C1 moves in a direction different from the direction leading to the enemy character C2, the enemy character C2 disappears from the screen of the display 2.

When the player's character C1 moves to the right or to the left of the enemy character C2, the enemy character C2 disappears from the screen. However, in the ground stage, since the two characters C1 and C2 are located on a virtual stage and their movements are limited only to those possible on the ground, even when the enemy character C2 disappears from the screen, the player can comparatively easily find the location of the enemy character C2. In other words, the player can always find the enemy character C2 by changing the direction the player's character C1 is facing and observing the ground over a range of 360 degrees.

Figure 16:
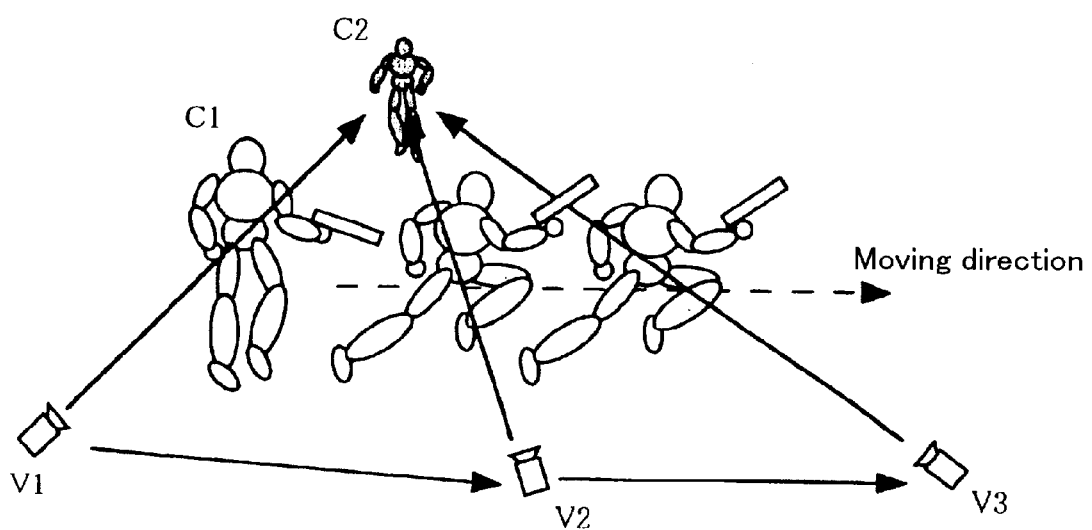
FIG. 16 is a diagram showing the locations of cameras V when the virtual space location is a "space stage"
Figure 17:
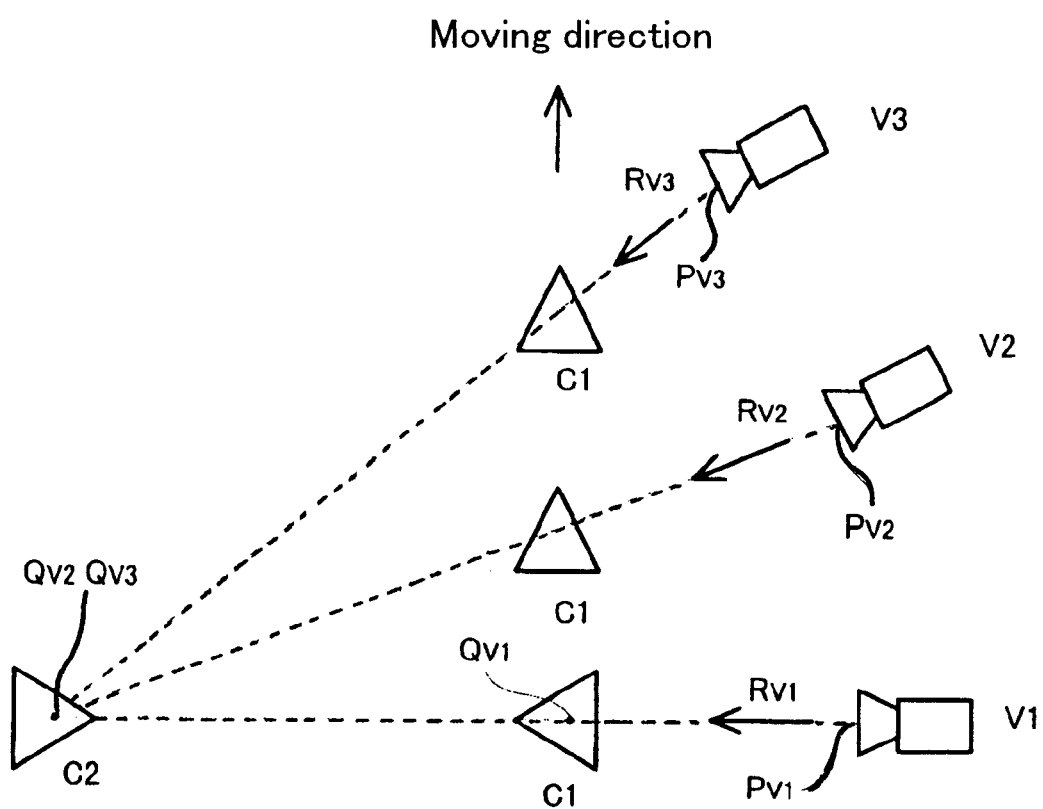
FIG. 17 is a top view of the virtual space location in FIG. 16 for explaining point of view P, point of fixation Q and viewing direction R in the space stage.

FIG. 16 is a diagram showing the position of the camera V when the space stage is selected in virtual space, and FIG. 17 is a top view of space stage in virtual space in FIG. 16 for explaining the point of view P, the point of fixation Q and the viewing direction R. As is shown in FIG. 17, when the two characters C1 and C2 facing each other in static positions in the space stage, a view obtained at the position of the camera V1 is displayed on the screen of the display 2. That is, as in the ground stage, the point of view $P_{V1}$ is set to the rear of the player's character c1, the point of fixation $Q_{V1}$ is set at the position of the player's character C1, and the viewing direction $R_{V1}$ is set forward of the player's character C1.

In the space stage, the player's character C1 and the enemy character C2 can freely move in three dimensions. Therefore, unlike the ground stage, they can freely move not only horizontally but vertically. In this case, if the same point of view P and point of fixation Q as those for the ground stage are set, when the direction of the player's character C1 is facing is changed as it moves, the point of view P and the viewing direction R (see the position of the camera V2 in FIG. 15) are changed, and the enemy character C2 disappears from the screen of the display 2.

Once the location of the enemy character C2 in the space stage is lost, unlike in the ground stage, it is difficult to find the position of the enemy character C2 because the player must perform a three-dimensional virtual space search.

Especially when the player's character C1 moves in the dash mode, at a greater speed than in the normal mode, the distance between the two characters C1 and C2 in virtual space is rapidly expanded within a short time, so that it is more difficult to find the position of the enemy character C2 once the character C1 has moved.

In the second embodiment, therefore, the point of view P and the point of fixation Q are so set that, when the player's character C1 moves in the dash mode in the space stage, the enemy character C2 does not disappear from the screen. Specifically, as is shown by the camera positions V2 and V3 in FIG. 17, the point of views $P_{V2}$ and $P_{V3}$ and the point of fixations $Q_{V2}$ and $Q_{V3}$ are so set that the player's character C1 and the enemy character C2 are aligned in the viewing directions $R_{V2}$ and $R_{V3}$.

More specifically, the point of views $P_{V2}$ and $P_{V3}$ are set on a line obtained by extending toward the player's character C1 a line segment which runs between the coordinates for the enemy character C2, or one of the nearby coordinates (preferably the coordinates near the waist of the enemy character C2), and the coordinates for the player's character C1 or one of the nearby coordinates (preferably, coordinates at a predetermined distance above the head of the player's character C1).

The point of fixations $Q_{V2}$ and $Q_{V3}$ are set on the line segment or a line which is obtained by extending the line segment toward the enemy character C2, and are, for example, coordinates near the waist of the enemy character C2. Therefore, since the viewing directions $R_{V2}$ and $R_{V3}$ from the respective point of views $P_{V2}$ and $P_{V3}$ are those directed toward the enemy character C2, the enemy character C2 does not disappear from the screen of the display 2. Furthermore, since the player's character C1 is present in front of the enemy character C2 in the viewing directions $R_{V2}$ and $R_{V3}$, the player's character C1 is also displayed on the screen.

After the player's character C1 has moved, it is halted facing the enemy character C2. At this time, even when the point of view P is set to the rear of the player's character C1, and the point of fixation Q is set at the position of the player's character C1, the enemy character C2 is located in the viewing direction R, and does not in this case disappear from the screen.

Therefore, even if the enemy character C2 disappears from the screen during the game, the player can obtain a view of the enemy character C2 on the screen by moving the player's character C1 in the dash mode.

Figure 18:
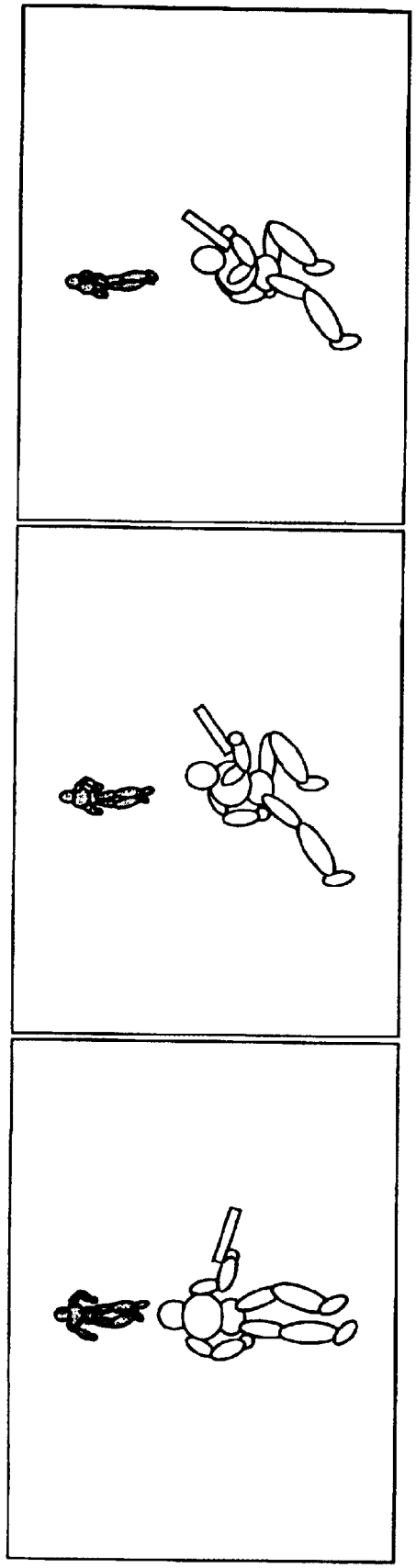
FIG. 18 is a diagram showing screens on the display corresponding to the camera V1, V2 and V3 in FIGS. 16 and 17.

In FIG. 18A, 18B and 18C are shown the screens of the display 2 which correspond to the cameras V1, V2 and V3 in FIGS. 16 and 17. In FIG. 18A is shown a view taken by the camera V1 when the position of the player's character C1 is static, facing the enemy character C1, as in FIG. 6. In FIGS. 18B and 18C are shown respective views taken by the cameras V2 and V3, where the player's character C1 is moving to the right of the screen in the dash mode. The point of view P is not set to the rear of the player's character C1, but, as is described above, is located along a line obtained by extending toward the player's character C1 a line segment which connects the position of the enemy character C2 and the position of the player's character C1. The point of fixation Q is located at the position of the enemy character C2.

Even when the player's character C1 is moving, therefore, the enemy character C2 is constantly located substantially in the center of the screen and does not disappear, and the player's character C1 is also displayed on the lower portion of the screen. Thus, the player can move the player's character C1 in the dash mode while continuing to monitor the position of the enemy character C2, so that the player does not lose sight of the enemy character C2 and can restart the combat with the enemy character C2 immediately after the player's character C1 has been moved. In this manner, the player can enjoy the combat with the enemy character C2 during a more extended period of time within a limited game period.

Figure 19:
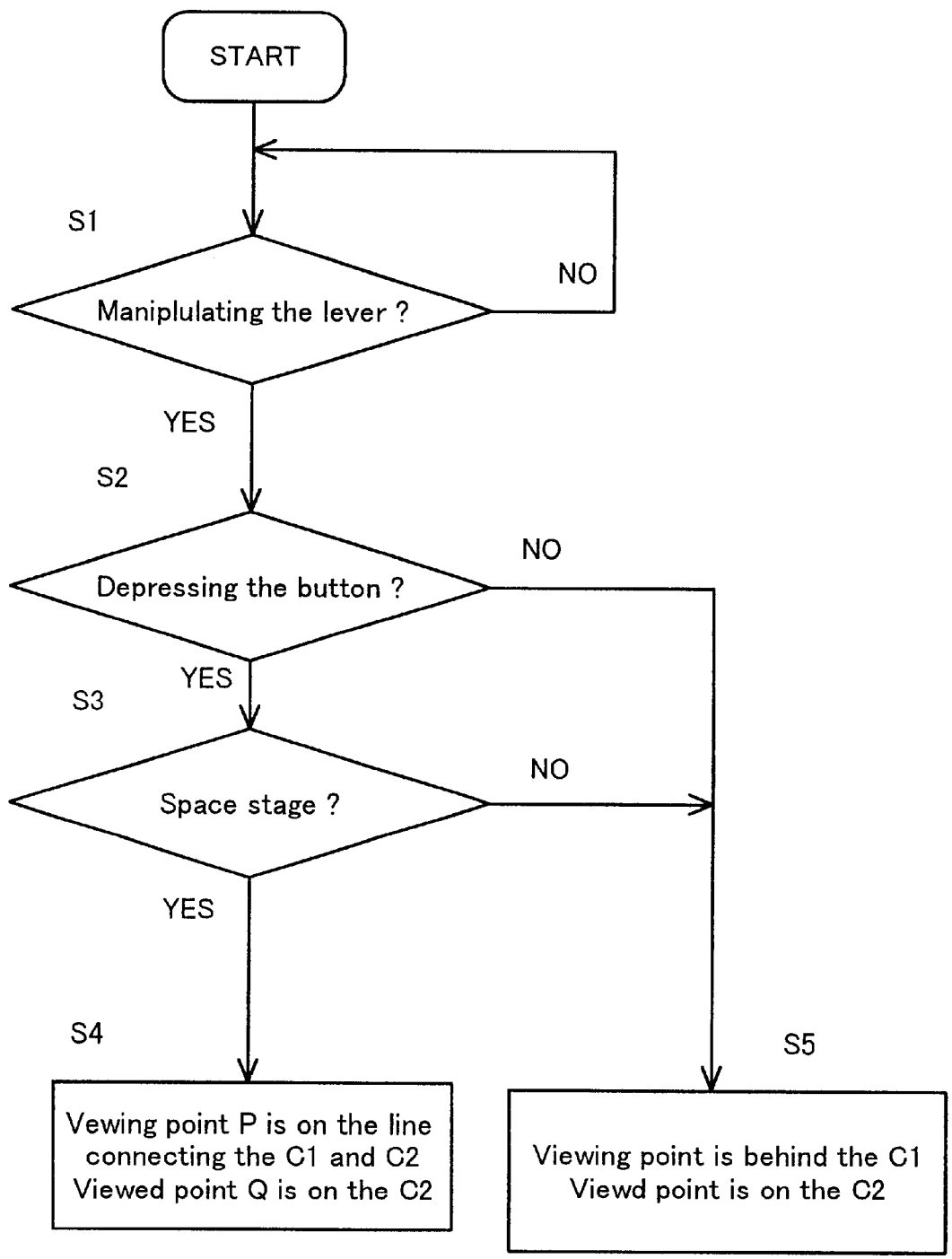
FIG. 19 is a flowchart according to a second embodiment of the present invention.

FIG. 19 is a flowchart showing the second embodiment of the present invention. When the lever is manipulated at step S1 and the button is depressed at step S2, the player's character C2 moves in the dash mode. At step S3 a check is performed to determine whether a current stage of a game is the space stage or the ground stage.

When the current stage is the space stage, at step S4, the point of view P is set along a line segment which connects the player's character C1 and the enemy character C2, and the point of fixation Q is set at the position of the enemy character C2, as is described above, so that both characters C1 and C2 are displayed on the screen.

When at step S2 the button is not depressed (i.e., the normal mode is selected) and at step S3 the current stage is the ground stage, and at step S5 the normal point of view P and point of fixation Q are set. That is, the point of view P is set to the rear of the player's character C1 and the point of fixation Q is set at the position of the player's character C1. Therefore, the viewing direction R is one in which the player's character C1 advances.

In the second embodiment, when in the space stage the player's character C1 moves in the normal mode, the point of view P and the point of fixation Q employed for the dash mode may be set.

As is described above, in the space stage, unlike in the ground stage, the enemy character C2 does not disappear from the screen even when the player's character C1 is moving, so that the player does not lose sight of the enemy character C2.

In some cases the enemy character C2 moves while the player's character C1 is moving. With the above described point of view P and the point of fixation Q, the enemy character C2 is always positioned in the center of the screen, even when moving, so that a player can not understand its movement direction. Therefore, when not only the player's character C1 but also the enemy character C2 moves, it is preferable that the display position of the enemy character C2 be shifted a predetermined distance in the direction of movement, and when the enemy character C2 moves, the point of fixation Q be shifted a predetermined distance in a direction opposite to the direction of movement. As a result, the position of the enemy character C2 on the screen is shifted from the center of the screen in the movement direction, so that the player can easily apprehend in which direction the enemy character C2 is moving.

[Third Embodiment]

A third embodiment of the present invention will now be described. In addition to the one-to-one combat game using virtual space as described in the above embodiment, is a one-to-multiple combat game will be described in the third embodiment.

In a one-to-multiple combat game, a player's character C1 and a plurality of enemy characters are displayed on the screen. The direction of camera V at this time (viewing direction R defined by the point of view P and the point of fixation Q) is set in accordance with the relationship between the position of the player's character and positions of a plurality of enemy characters, as will be described later.

Figure 20:
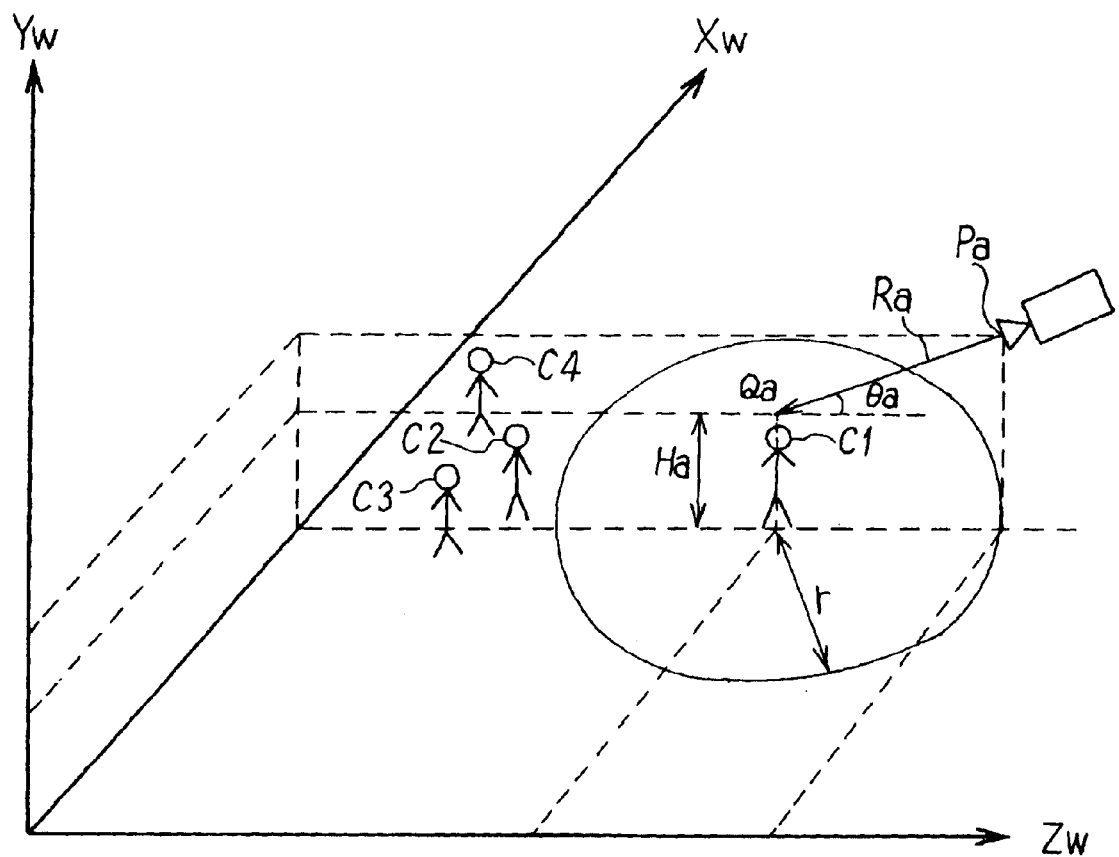
FIG. 20 is a diagram showing the direction a camera V is aimed when a player's character in virtual space is positioned at a distance from a plurality of enemy characters.

FIG. 20 is a diagram showing the direction of the camera V when the player's character at a distance from a plurality of enemy characters in virtual space. Specifically, the distance between the player's character C1 and the nearest enemy character C2 is greater than a predetermined radius r (e.g., 3.5 m in the virtual space). The distance between the player's character C1 and the nearest character C2 is selected because it is assumed that the nearest character C2 will be the first to approach the player's character C1 and Light it.

In this case, the camera V is so positioned that the player's character C1 and the enemy character C2 are aligned along the viewing direction $R_a$. In other words, the viewing direction $R_a$ is so set that the player's character C1 is displayed at the front in the image and the enemy character C2 is displayed at the rear in the image. More specifically, the point of view P is set along a line extending in a direction opposite the direction leading toward the nearest enemy character C2 from the point of fixation $Q_a'$ which is located at a predetermined height $H_a$ above the lower end of the player's character C1 in the direction of height (in the $Y_W$ direction). The line defined by the viewing direction $R_a'$ which extends from the point of view $P_a$ to the point of fixation $Q_a'$ points downward at an angle θa relative to the horizontal direction. The angle θa is, for example, 12.5 degrees.

Figure 21:
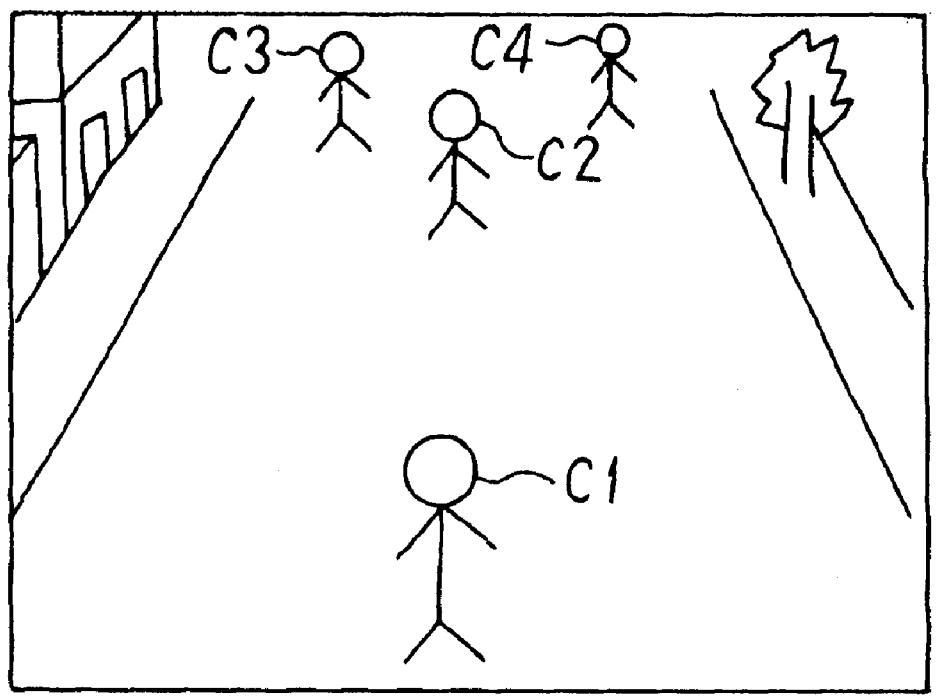
FIG. 21 is a diagram showing an example screen on a display which corresponds to FIG. 20.

FIG. 21 is a diagram showing an example screen for the display 2 corresponding to FIG. 20. As is shown in FIG. 21, as the virtual space is viewed from the viewing direction $R_a'$ the player's character C1 is displayed at the front on the screen, and a plurality of enemy characters C2, C3 and C4 are displayed at the rear in the image.

Since the player's character C1 is displayed at the front and thus the player has substantially the same view as has the player's character C1, to the player it seems as though he or she were the player's character C1, and is thus provided a more natural view. In addition, the enemy characters, who are at a distance, can be displayed on the screen without reducing the display size of the player's character C1.

Figure 22:
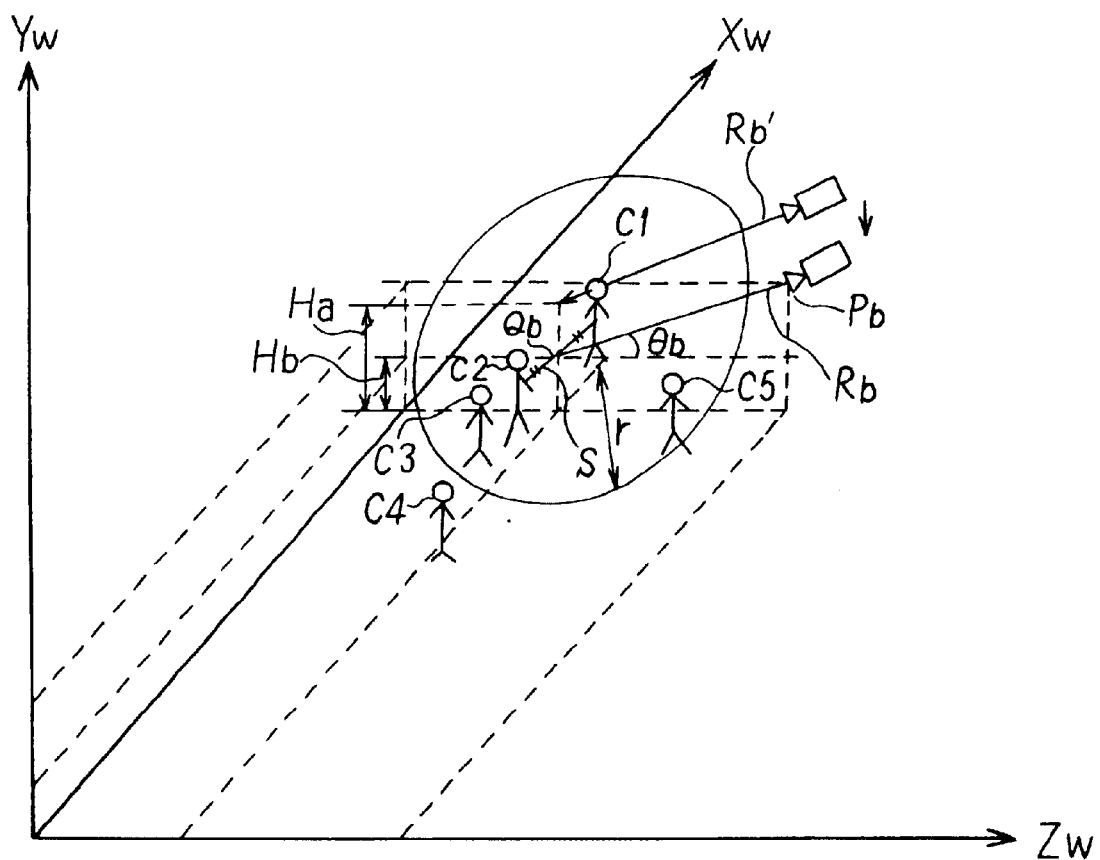
FIG. 22 is a graph showing the direction the camera V is aimed when a player's character in virtual space is near a plurality of enemy characters.

FIG. 22 is a graph showing the direction of aim of the camera V when the player's character C1 is near a plurality of enemy characters in virtual space. Specifically, the distance between the player's character C1 and the nearest enemy character C2 is, for example, less than a predetermined radius (3.5 m).

In this case, the camera V is so positioned that the player's character C1 and the nearest enemy character C2 are located at the left (right) and at the right (left) relative to the viewing direction.

FIG. 22 is a graph showing the direction of aim of the camera V when the player's character C1 is near a plurality of enemy characters in virtual space. Specifically the distance between the player's character C1 and the nearest enemy character C2 is, for example, less than a predetermined radius (3.5 m).

In this case, the camera V is so positioned that the player's character C1 and the nearest enemy character C2 are located at the left (right) and at the right (left) relative to the viewing direction $R_b$ is so set that the player's character C1 and the nearest enemy character C2 are displayed side by on the screen.

More specifically, point of view $P_b$ is set on a line which extends, substantially perpendicular to a line segment S connecting the player's character C1 and the nearest enemy character C2, from the point of fixation $Q_b'$ which is positioned at the height $H_b$ and constitutes the coordinates of the middle point of the line segment S. The viewing direction $R_b$ extending from the point of view $P_b$ to the point of fixation $Q_b$ is inclined downward at an angle $θ_b$ relative to the horizontal direction. The angle $θ_b'$ as well as the angle $θ_a'$ is approximately 12.5 degrees.

The height $H_b$ is set smaller than the height Ha by a predetermined height DH (e.g., 1 m in virtual space). Thus, the point of view $P_b$ and the point of fixation $Q_b$ are also set lower by a distance equal to the predetermined height DH, and therefore, the viewing direction $R_b$ is lower by the predetermined height DH than the viewing direction $R_b'$, which is obtained when it is assumed that the viewing direction $R_a$ is changed at the height Ha. The reason for this will be explained below.

In FIG. 22, assume that besides the nearest enemy character C2, an enemy character C5 exists within the predetermined radius r and very near the camera V. In this case, when a high viewing direction $R_b$ is set, the enemy character C5 falls outside the projection range of the camera V, even though it is within the predetermined range r, and is therefore not displayed on the screen.

Figure 23:
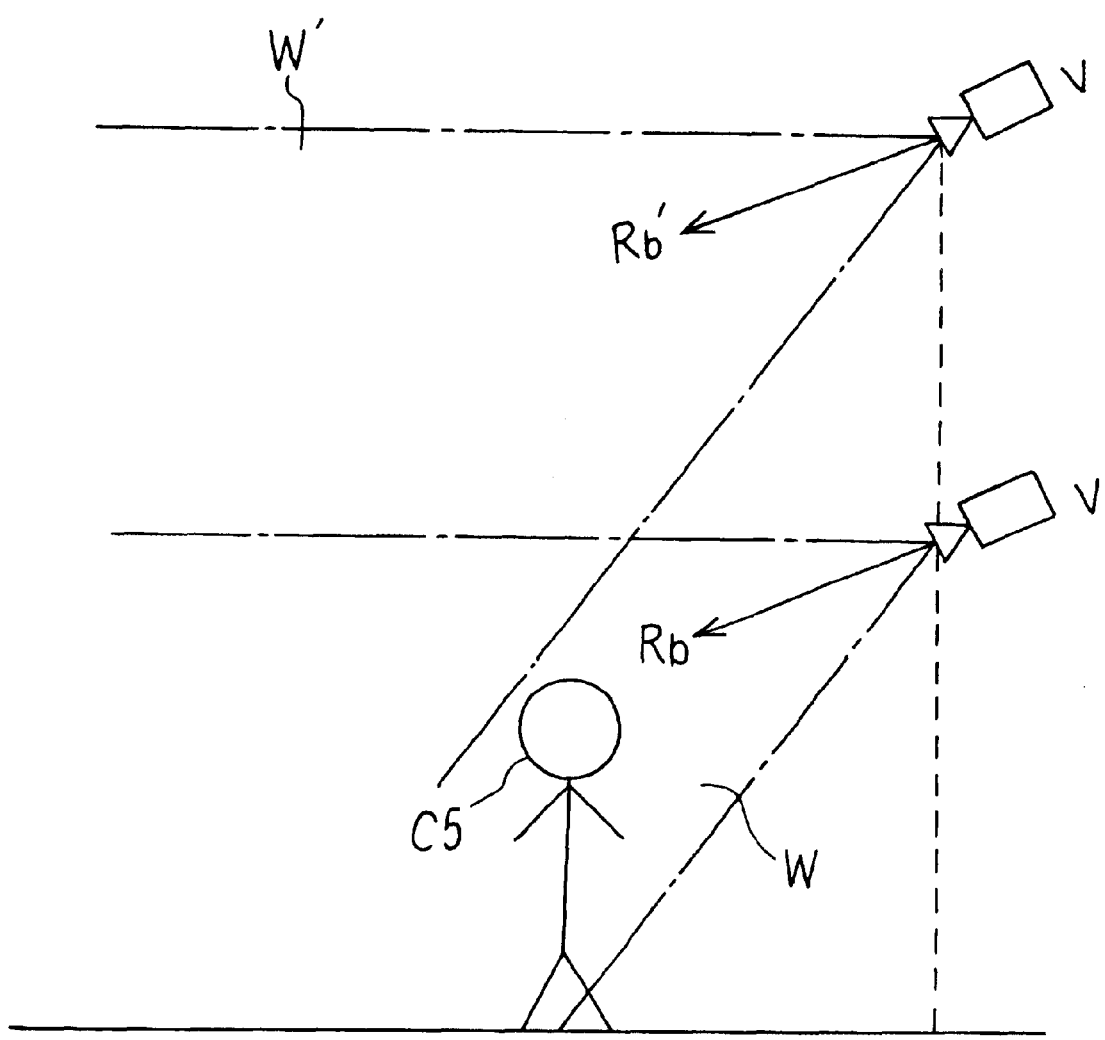
FIG. 23 is a graph showing the a pick-up range for the camera V in virtual space.

FIG. 23 is a diagram showing the shooting range of the camera V in virtual space. As is shown in FIG. 23, when the enemy character C5 is positioned very near the camera V, enemy character C5 can be taken in shooting range W in the viewing direction $R_b$ and can be displayed on the screen. In shooting range W' in the viewing direction $R_b'$, which is higher than the viewing direction $R_b'$ the enemy character C5 can not be taken by the camera V and can not be displayed on the screen. In order to avoid this problem, the height $H_b$ for the viewing direction $R_b$ is set smaller than the height Ha of the viewing direction $R_a$.

In addition, when the player's character C1 and the enemy character C2 separated from each other as is shown in FIG. 20, no enemy character is located near the camera V. Therefore, the viewing direction $R_a$ is set high and a wide-range view of virtual space wherein a plurality of enemy characters are present can be displayed on the screen.

As is apparent from the above description, the angle $θ_b$ for the viewing direction $R_b$ and the angle $θ_a$ for the viewing direction $R_a$ are the same.

Figure 24:
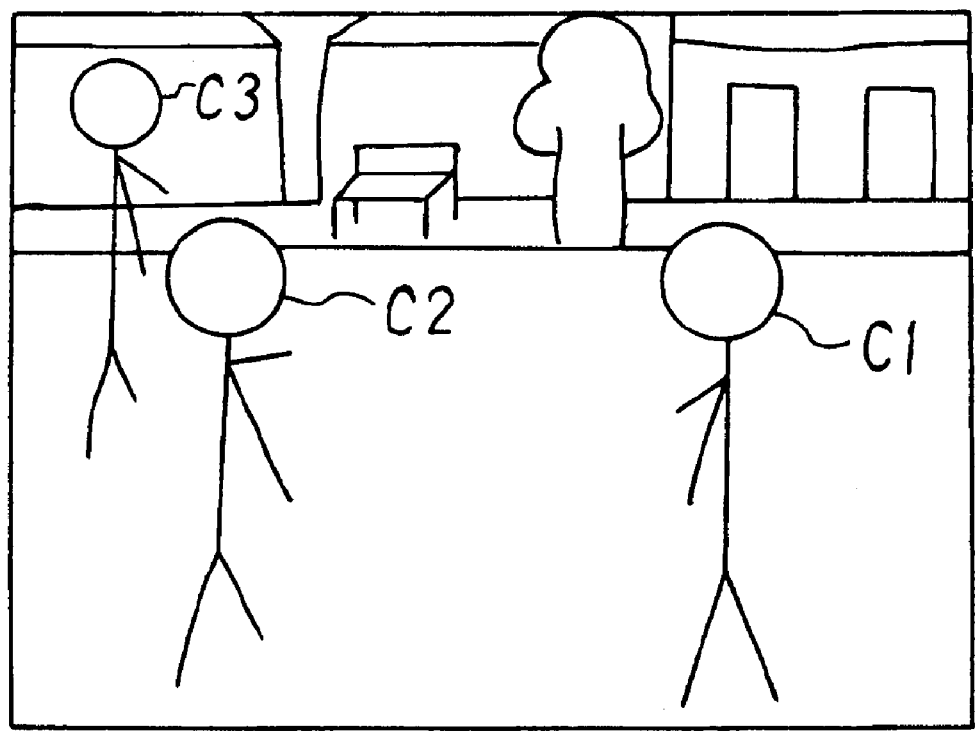
FIG. 24 is a diagram showing an example screen on the display corresponding to FIG. 22.

FIG. 24 is a diagram showing an example screen of the display 2 corresponding to FIG. 22. As is apparent in FIG. 24, since the virtual space is viewed from the viewing direction $R_b$, the player's character C1 and the nearest enemy character C2 are displayed side by side on the screen.

Since the player's character C1 and the enemy character C2 are displayed in the transverse direction on the screen, i.e., located side by side, the player can more easily understand how far apart the characters C1 and C2 are than when they are arranged toward the rear on the screen as is shown in FIG. 21. For a combat game wherein characters fight at close quarter, it is preferable that the player's character C1 and the enemy character C2 be so displayed on the screen that the distance between the two can be readily perceived.

Figure 25:
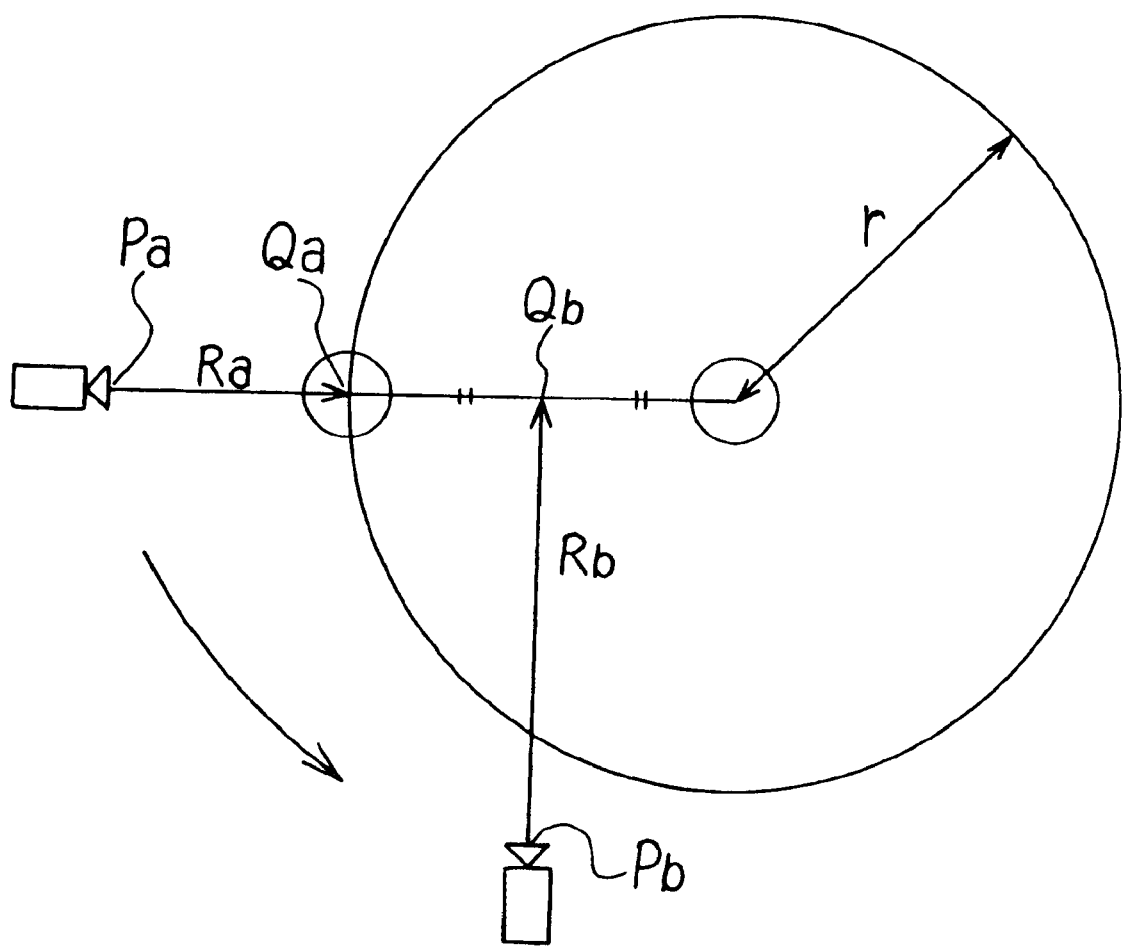
FIG. 25 is a specific top view of a location in virtual space for explaining the switching between viewing direction $R_a$ in FIG. 20 and viewing direction $R_b$ in FIG. 22.

FIG. 25 is a specific top view of a location in virtual space for explaining the switching in the viewing direction $R_a$ in FIG. 20 and in the viewing direction $R_b$ in FIG. 22. In FIG. 25, when the distance between the player's character C1 and the enemy character C2 is equal to a predetermined radius R, the camera V spends a predetermined period of time moving from the point of view Pa to the point of view $P_b'$ while drawing a circle at the point of fixation $Q_b$. Therefore, the screen is gradually changed in accordance with changes in the position of the camera V until the camera V reaches the point of view $P_b$ from the point of view Pa, so that the image is changed smoothly.

Figure 26:
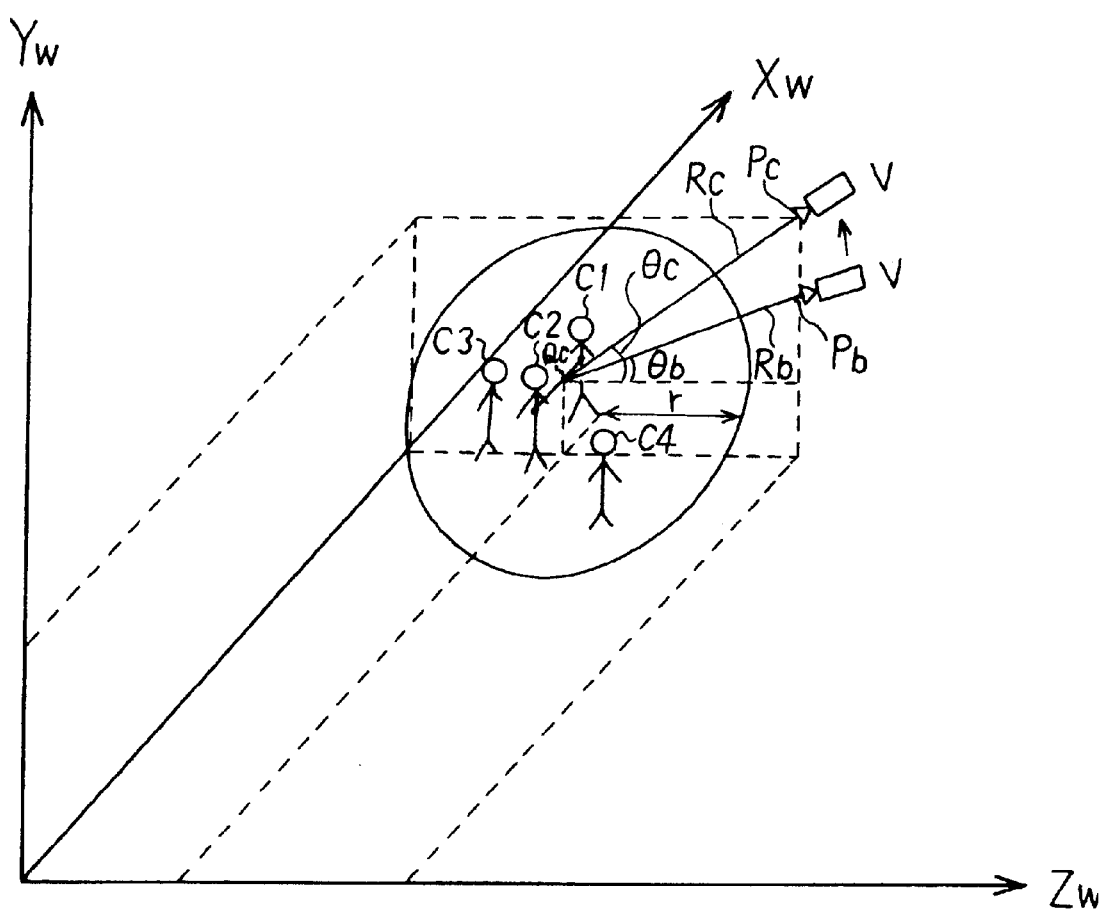
FIG. 26 is a diagram showing the direction the camera V is aimed in the example in FIG. 22 when a plurality of enemy characters are located within a predetermined radius r in FIG. 25.

FIG. 26 is a graph showing the direction the camera V faces in the case in FIG. 22, i.e., when the distance between the player's character C1 and the nearest enemy character c2 is less than the predetermined radius r, and when a plurality of enemy characters are present within the radius r.

An angle $θ_c$ in viewing direction $R_c$ is set so it is greater than the angle $θ_b$ in the viewing direction $R_b$. More specifically, the point of view $P_c$ in the viewing direction $R_c$ is set higher than the point of view $P_b'$ and the point of fixation $Q_c$ is the same as the point of fixation $Q_b$. And the angle $θ_c$ is, for example, 30 degrees.

The angle $\theta_c$ is set greater than the angle $\theta_b$ for the following reasons. When many characters are present in such a narrow range that a plurality of enemy characters (e.g., more than three) exist within the predetermined radius r, the enemy characters, or the player's character C1 and the enemy characters, will overlap in the image. In this case, the character at the rear will be hidden by the front character, and the player will not be able to watch the movement of the hidden character. Especially when the player's character C1 fights the enemy character hidden at the rear, the player can not watch the movement of the enemy character and can not avoid an attack by the enemy character.

In order to prevent an such inconvenience, when many characters are present within a small range, the angle for the viewing direction is increased to provide a view wherein virtual space is viewed from above, so that the characters do not overlap each other.

Therefore, since a player can clearly identify the movement of the enemy character at the rear in the image, the player's character C1 can quickly cope with an attack by that enemy character.

Figure 27:
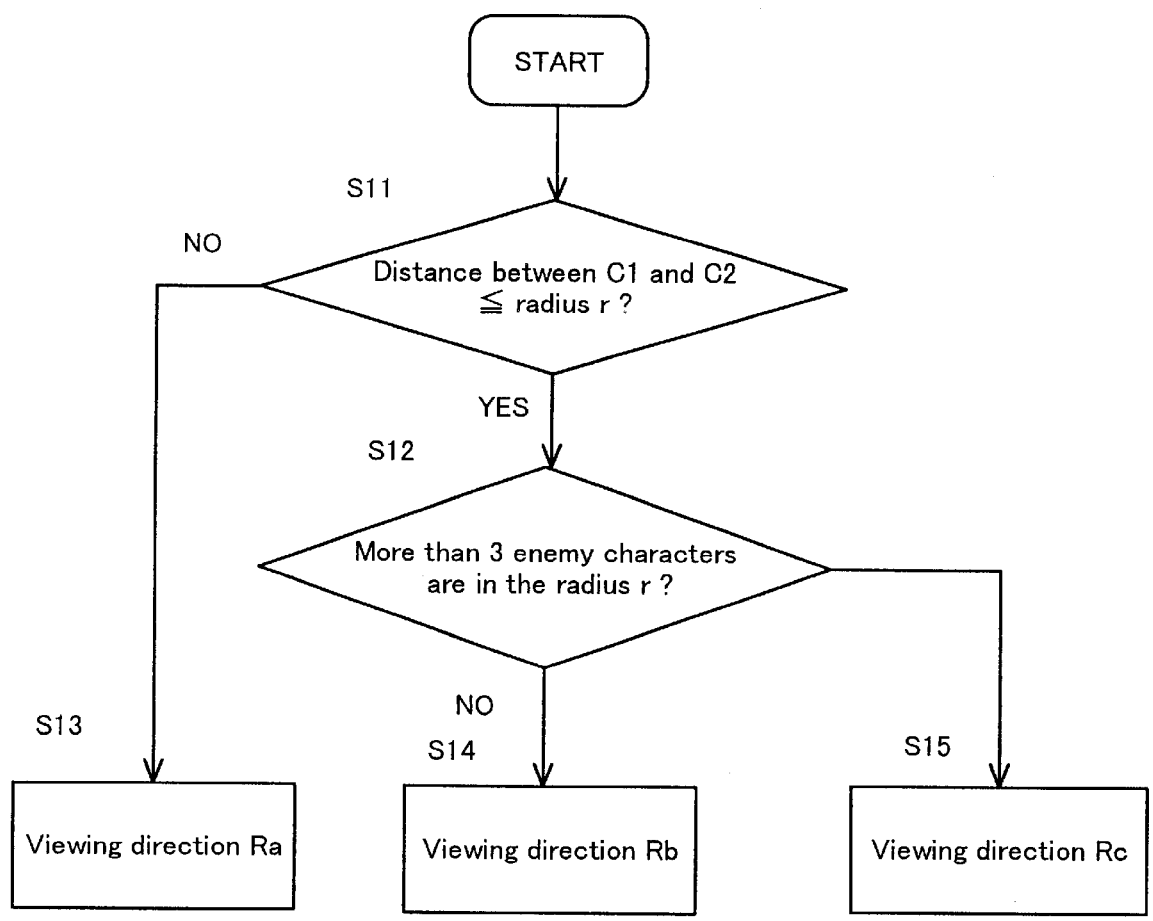
FIG. 27 is a flowchart according to a third embodiment of the present invention.

FIG. 27 is a flowchart for the third embodiment of the present invention. At step S11 the distance between the player's character C1 and the nearest enemy character C2 is examined. When the distance between the two characters is greater than the predetermined radius r, next step is step S13, whereat a view in the viewing direction $R_a$ is displayed which has been explained while referring to FIGS. 20 and 21, i.e., a view wherein the player's character C1 and the enemy character C2 are aligned at the rear.

When the distance between the two characters is equal to or smaller than the predetermined radius r, next step is step S12, whereat the number of enemy characters present within the predetermined radius r is examined. When, at step S12, the number of enemy characters is smaller than a predetermined number (e.g., three), program control advances to step S14, whereat a view in the viewing direction $R_b$' i.e., the player's character C1, the enemy character C2, etc., is displayed in the transverse direction in the image.

When at step S12 the number of enemy characters is greater than the predetermined number, next step is step S15, whereat a view is displayed in the viewing direction $R_b$' which is so inclined that it points upward more than does the viewing direction $R_b$.

According to the present invention, when the characters approach each other in virtual space in a game, the point of view in virtual space is raised, so that a view is displayed on the screen where the activity in virtual space is looked down on. Therefore, since the character manipulated by the player and the enemy character do not overlap in the image, the player can clearly observe the movements of the enemy character. And even when the two characters are fighting in close, since the character controlled by the player can quickly cope with an attack by the enemy character, the game will be more exiting.

In addition, since an upper limit is provided for the rising of the point of view, setting the point of view immediately above a character can be prevented so that there is no deterioration of the sensation that three-dimensional distances in virtual space are displayed on the screen.

The point of view and the point of fixation can be so set that both the player's character and the enemy character can be displayed on the screen, even when one or both of them are moving in arbitrary directions in three-dimensional virtual space. As a result, the enemy character will not disappear from the screen, and the player will not lose sight of the enemy character.

Since, for the one-to-multiple combat game the viewing direction is changed in accordance with the positional relationship existing between the player's character C1 and the enemy characters, a view can be provided which makes it easy for the player to understand the relationship between the positions of the player's character and the enemy character C2.

What is claimed is:

1. A computer game apparatus for displaying a image of virtual space in which first and second characters arc located, the image being viewed from a first point in the virtual space looking towards a second point in the virtual space, comprising:

a first processor for obtaining positions of the first and second characters in the virtual space; and a second processor for setting the first or second point in accordance with a distance between the positions of the first and second characters;

wherein the first character, the second character, the first point, and the second point are each in a vertical plane of said virtual space, and when the distance between the positions of the first and second characters is less than a predetermined distance, the second processor calculates an angle of the direction with horizon in accordance with the distance, and sets the first or second point based on the angle.

2. A computer game apparatus for displaying an image of virtual space in which first and second characters are located, the image being viewed from a first point in the virtual space looking towards a second point in the virtual space, comprising:

a first processor for obtaining positions of the first and second characters in the virtual space; and a second processor for setting the first or second point in accordance with a distance between the positions of the first and second characters;

wherein the first character, the second character, the first point, and the second point are each in a vertical plane of said virtual space, and wherein the second processor sets the first point higher in a height direction as the distance is shorter, and sets the first point lower in the height direction as the distance is longer.

3. A computer game apparatus according to claim 1, wherein, when the angle is greater than a predetermined maximum angle, the second processor sets the first point in accordance with the predetermined maximum angle.

4. A computer game apparatus according to claim 3, wherein the predetermined maximum angle is approximately 40 degrees.

5. A computer game apparatus according to claim 1, wherein when the first character approaches the second character at a higher speed than a normal speed, and the distance between the first and second characters is less than a predetermined distance, the second processor sets the first point in accordance with an angle smaller than the angle obtained by the calculation.

6. A computer game apparatus according to claim 5, wherein, when the speed of the first character is returned to the normal speed or the first character is halted, the second processor sets the first point in accordance with the angle obtained by the calculation.

7. A computer game apparatus for displaying an image of virtual space in which first and second characters are located, the image being viewed from a first point in the virtual space looking towards a second point in the virtual space, comprising:

a first processor for obtaining positions of the first and second characters in the virtual space; and a second processor for setting the first or second point in accordance with a distance between the positions of the first and second characters;

wherein the first character, the second character, the first point, and the second point are each in a vertical plane of said virtual space, and when the distance between the first and second characters is less than a predetermined distance, the second processor sets the first point as a distance between the first and second point is shortened.

8. A computer game apparatus according to claim 7, wherein the second processor sets the first point as the distance between the first and second points is shortened in a first time period.

9. A computer game apparatus according to claim 8, wherein, when the first character approaches the second character at a higher speed than the normal speed, the second processor sets the first point as the distance between the first and second points is shortened in a second time period which is shorter than the first time period.

10. A computer game apparatus for displaying an image of virtual space in which first and second characters are located, the image being viewed from a first point in the virtual space looking towards a second point in the virtual space, comprising:

a first processor for obtaining positions of the first and second characters in the virtual space; and a second processor for setting the first or second point in accordance with a distance between the positions of the first and second characters;

wherein the first character, the second character, the first point, and the second point are each in a vertical plane of said virtual space, and wherein the second processor sets the second point at a first height in the height direction in virtual space, the first height being the vicinity of an upper portion of the other character, and when the distance between the first and second characters is less than a predetermined distance, the second processor sets the second point at a second height higher than the first height.

11. A computer game apparatus according to claim 10, wherein the second processor moves the second point from the first height to the second height in a third time period.

12. A computer game apparatus according to claim 11, wherein, when the first character approaches the second character at a higher speed than the normal speed, the second processor moves the second point from the first height to the second height in a fourth time period which is shorter than the third time period.

13. A computer game apparatus according to claim 10, wherein the second processor sets the first point higher than the second point.

14. A method for displaying an image of virtual space in which first and second characters are located, the image being viewed from a first point in the virtual space looking towards a second point in the virtual space wherein the first character, the second character, the first point, and the second point are each in a vertical plane of said virtual space, comprising:

obtaining positions of the first and second characters in the virtual space;

setting the first or second point in accordance with a distance between the position of the first and second characters;

calculating an angle of the direction with horizon in accordance with the distance, when the distance between the positions of the first and second characters is less than a predetermined distance; and setting the first or second point based on the angle.

15. A method for displaying an image of virtual space in which first and second characters are located, the image being viewed from a first point in the virtual space looking towards a second point in the virtual space wherein the first character, the second character, the first point, and the second point are each in a vertical plane of said virtual space, comprising:

obtaining positions of the first and second characters in the virtual space;

setting the first or second point in accordance with a distance between the position of the first and second characters; and setting the first point higher in a height direction as the distance is shortened.

16. A method for displaying an image of virtual space in which first and second characters are located, the image being viewed from a first point in the virtual space looking towards a second point in the virtual space wherein the first character, the second character, the first point, and the second point are each in a vertical plane of said virtual space, comprising:

obtaining positions of the first and second characters in the virtual space;

setting the first or second point in accordance with a distance between the position of the first and second characters; and setting the first point as a distance between the first and second points is shortened when the distance between the first and second characters is less than a predetermined distance.

17. A method for displaying an image of virtual space in which first and second characters are located, the image being viewed from a first point in the virtual space looking towards a second point in the virtual space wherein the first character, the second character, the first point, and the second point are each in a vertical plane of said virtual space, comprising:

obtaining positions of the first and second characters in the virtual space;

setting the first or second point in accordance with a distance between the position of the first and second characters;

setting the second point at a first height in the height direction in virtual space, the first height being the vicinity of an upper portion of the other character; and setting the second point at a second height higher than the first height when the distance between the first and second characters is less than a predetermined distance.

18. A medium having a computer game program for executing a game displaying an image of virtual space in which first and second characters are located, the image being viewed from a first point in the virtual space looking towards a second point in the virtual space, the computer program comprising the steps of:

obtaining positions of the first and second characters in the virtual space; and setting the first or second point in accordance with a distance between the positions of the first and second characters;

wherein the first character, the second character, the first point, and the second point are each in a vertical plane of said virtual space;

calculating an angle of the direction with horizon in accordance with the distance, when the distance between the positions of the first and second characters is less than a predetermined distance; and setting the first or second point based on the angle.

19. A medium having a computer game program for executing a game displaying an image of virtual space in which first and second characters are located, the image being viewed from a first point in the virtual space looking towards a second point in the virtual space, the computer program comprising the steps of:

obtaining positions of the first and second characters in the virtual space; and setting the first or second point in accordance with a distance between the positions of the first and second characters;

wherein the first character, the second character, the first point, and the second point are each in a vertical plane of said virtual space; and setting the first point higher in a height direction as the distance is shorter.

20. A medium having a computer game program for executing a game displaying an image of virtual space in which first and second characters are located, the image being viewed from a first point in the virtual space looking towards a second point in the virtual space, the computer program comprising the steps of:

obtaining positions of the first and second characters in the virtual space; and setting the first or second point in accordance with a distance between the positions of the first and second characters;

wherein the first character, the second character, the first point, and the second point are each in a vertical plane of said virtual space; and setting the first point as a distance between the first and second points is shortened when the distance between the first and second characters is less than a predetermined distance.

21. A medium having a computer game program for executing a game displaying an image of virtual space in which first and second characters are located, the image being viewed from a first point in the virtual space looking towards a second point in the virtual space, the computer program comprising the steps of:

obtaining positions of the first and second characters in the virtual space; and setting the first or second point in accordance with a distance between the positions of the first and second characters;

wherein the first character, the second character, the first point, and the second point are each in a vertical plane of said virtual space;

setting the second point at a first height in the height direction in virtual space, the first height being the vicinity of an upper portion of the other character; and setting the second point at a second height higher than the first height when the distance between the first and second characters is less than a predetermined distance.

22. A computer game apparatus for displaying an image of virtual space in which first and second characters are located, the image being viewed from a first point in the virtual space looking towards a second point in the virtual space, comprising:

a first processor for obtaining movement of the first character in the virtual space; and a second processor for setting the first and second points, without relation to a moving direction of the first character, wherein the first character, the second character, the first point, and the second point are each in a vertical plane of said virtual space and the second processor sets the first point along a line obtained by extending a line segment which runs between one of points constituting the first character and their vicinity and one of points constituting the second character and their vicinity toward the first character, and sets the second point along the line segment or along a line obtained by extending the line segment toward the second character.

23. A computer game apparatus for displaying an image of virtual space in which first and second characters are located, the image being viewed from a first point in the virtual space looking towards a second point in the virtual space, comprising:

a first processor for obtaining movement of the first character in the virtual space; and a second processor for setting the first and second points, without relation to a moving direction of the first character, wherein the first character, the second character, the first point, and the second point are each in a vertical plane of said virtual space, and when the first character is moving at a first speed or at a second speed higher than the first speed, the predetermined speed is the second speed.

24. A computer game apparatus for displaying an image of virtual space in which first and second characters arc located, the image being viewed from a first point in the virtual space looking towards a second point in the virtual space, comprising:

a first processor for obtaining movement of the first character in the virtual space; and a second processor for setting the first and second points, without relation to a moving direction of the first character, wherein the first character, the second character, the first point, and the second point are each in a vertical plane of said virtual space, and wherein the first and second characters are capable of moving in arbitrary directions in three dimensions in the virtual space.

25. A computer game apparatus for displaying an image of virtual space in which first and second characters are located, the image being viewed from a first point in the virtual space looking towards a second point in the virtual space, comprising:

a first processor for obtaining movement of the first character in the virtual space; and a second processor for setting the first and second points, without relation to a moving direction of the first character, wherein the first character, the second character, the first point, and the second point are each in a vertical plane of said virtual space, and when the second character moves, the second processor shifts the second point with a predetermined distance in a direction opposite to a direction in which the second character moves.

26. A computer game for displaying an image of virtual space in which a first and a plurality of other characters are faced, the image being viewed from a first point in the virtual space looking towards a second point in the virtual space, comprising:

a first processor for obtaining positions of the first character and the other characters in the virtual space; and a second processor for setting the first and second points in accordance with a relationship between the position of the first character and the position of at least one of the other characters;

wherein the relationship includes a distance between the first character and a second character, the second character being one of the plurality of other characters that is closest to the first character in the virtual space, and when the distance between the first character and the second character in the virtual space is greater than a predetermined distance, the second processor sets the first point and the second point so that the first character and the second character are displayed aligned in the depth direction of the image, and when the distance in the virtual space is equal to or less than the predetermined distance, the second processor sets another first point and another second point so that the first and second characters are displayed in a transverse direction on the image.

27. The computer game apparatus according to claim 26, wherein the first point and the second point are located higher by a predetermined height than the another first point and the another second point.

28. The computer game apparatus according to claim 27, wherein when the plurality of other characters are located within the predetermined distance, the second processor sets the another first point so as to increase an angle of another direction from the another first point to the another second point with horizon.

* * * * *